(12) United States Patent
Dietz

(10) Patent No.: US 10,596,505 B1
(45) Date of Patent: *Mar. 24, 2020

(54) FILTRATION SYSTEM AND METHOD

(71) Applicant: Osprey Corporation, Atlanta, GA (US)

(72) Inventor: Todd Dietz, Atlanta, GA (US)

(73) Assignee: Osprey Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/101,957

(22) Filed: Aug. 13, 2018

Related U.S. Application Data

(60) Continuation of application No. 14/858,581, filed on Sep. 18, 2015, now Pat. No. 10,046,261, which is a continuation of application No. 14/060,574, filed on Oct. 22, 2013, now abandoned, which is a division of application No. 13/445,767, filed on Apr. 12, 2012, now Pat. No. 8,597,391.

(60) Provisional application No. 61/517,004, filed on Apr. 12, 2011.

(51) Int. Cl.
| | |
|---|---|
| *B01D 46/00* | (2006.01) |
| *B01D 46/46* | (2006.01) |
| *B01D 46/44* | (2006.01) |
| *B01D 46/10* | (2006.01) |
| *B01D 46/26* | (2006.01) |
| *B01D 46/24* | (2006.01) |

(52) U.S. Cl.
CPC ..... *B01D 46/0023* (2013.01); *B01D 46/0056* (2013.01); *B01D 46/0079* (2013.01); *B01D 46/10* (2013.01); *B01D 46/2403* (2013.01); *B01D 46/26* (2013.01); *B01D 46/446* (2013.01); *B01D 46/46* (2013.01)

(58) Field of Classification Search
CPC ............ B01D 46/0023; B01D 46/0056; B01D 46/0079; B01D 46/20; B01D 46/24; B01D 46/2403; B01D 46/26; B01D 46/446; B01D 46/46
See application file for complete search history.

(56) References Cited

U.S. PATENT DOCUMENTS

| | | | |
|---|---|---|---|
| 1,680,977 A | 8/1928 | Garner | |
| 1,747,364 A | 2/1930 | Greene | |
| 1,788,171 A | 1/1931 | Preble | |

(Continued)

FOREIGN PATENT DOCUMENTS

| | | |
|---|---|---|
| CN | 201636999 | 11/2010 |
| JP | 2003322029 | 11/2003 |

OTHER PUBLICATIONS

IBIS International, G-3 Process Air Filter System, Bulletin, dated Aug. 26, 2011, 1 page.

(Continued)

*Primary Examiner* — Robert Clemente
(74) *Attorney, Agent, or Firm* — Kilpatrick Townsend & Stockton LLP

(57) ABSTRACT

Described are multi-stage drum filtration systems including a primary rotary drum filter stage, at least one passive filter stage, and a main fan configured to create a vacuum on an inlet side of the primary rotary drum filter stage. The multi-stage drum filtration system may also include a HEPA filter stage. A controller may be configured to control a speed of the main fan to maintain an inlet vacuum to the primary rotary drum filter stage that corresponds to an inlet vacuum set point input.

20 Claims, 18 Drawing Sheets

(56) References Cited

U.S. PATENT DOCUMENTS

| | | |
|---|---|---|
| 1,975,335 A | 10/1934 | Smith |
| 2,328,220 A | 8/1943 | Linderoth |
| 2,792,906 A | 5/1957 | Evans |
| 3,177,592 A | 4/1965 | Meyer |
| 3,345,805 A | 10/1967 | Sherrill |
| 3,472,002 A | 10/1969 | Brown et al. |
| 3,483,675 A | 12/1969 | King, Jr. |
| 3,628,313 A | 12/1971 | Broadbent et al. |
| 3,667,195 A | 6/1972 | Angilly, Jr. et al. |
| 3,864,107 A | 2/1975 | Baigis, Jr. |
| 4,222,754 A | 9/1980 | Horvat |
| 4,253,855 A | 3/1981 | Jackson et al. |
| 4,360,432 A | 11/1982 | Kieronski |
| 4,382,857 A | 5/1983 | Laughlin |
| 4,427,422 A | 1/1984 | Niederer |
| 4,481,021 A | 11/1984 | Kinney, Jr. et al. |
| 4,531,890 A | 7/1985 | Stokes |
| 4,654,059 A | 3/1987 | Matyas |
| 4,689,143 A | 8/1987 | Miers |
| 4,725,292 A | 2/1988 | Williams |
| 4,895,581 A | 1/1990 | Starling |
| 4,927,435 A | 5/1990 | Anson |
| 5,069,691 A | 12/1991 | Travis et al. |
| 5,181,945 A | 1/1993 | Bodovsky |
| 5,279,629 A | 1/1994 | Stueble |
| 5,433,763 A | 7/1995 | Shagott et al. |
| 5,474,598 A | 12/1995 | Harpole, Jr. et al. |
| 5,593,470 A | 1/1997 | Shagott et al. |
| 5,607,647 A | 3/1997 | Kinkead |
| 5,626,820 A | 5/1997 | Kinkead et al. |
| 5,679,136 A | 10/1997 | Phillips et al. |
| 5,709,721 A | 1/1998 | Stueble |
| 5,925,155 A | 7/1999 | Rodgers |
| 6,217,637 B1 | 4/2001 | Toney et al. |
| 7,128,771 B2 | 10/2006 | Harden |
| 7,258,728 B2 | 8/2007 | Lim et al. |
| 7,332,012 B2 | 2/2008 | O'Connor et al. |
| 8,597,391 B1 | 12/2013 | Dietz |
| 8,679,236 B1 | 3/2014 | Dietz |
| 10,046,261 B2 * | 8/2018 | Dietz ................. B01D 46/2403 |
| 2010/0192528 A1 | 8/2010 | Mann et al. |

OTHER PUBLICATIONS

IBIS International, Efficiency & Exhaust Air Quality Troubleshooting: Rotary Drum Filters, Technical Bulletin 030111, dated Aug. 26, 2011, 1 page.

IBIS International, G-3 Process Air Filter System, Technical Bulletin 051211, dated Aug. 26, 2011, 1 page.

Confirmation by Osprey Corporation's fax No. 92/1315, dated Jul. 15, 1992 confirming a request by Julian Malva of Johnson & Johnson Do Brasil for a "unique application".

JRM facsimile date Aug. 6, 1992 with reference to "one unit . . . for two machines".

Osprey Quotation No. 6303-4 dated Oct. 6, 1992.

Facsimile to Mr. Julio Malva dated Oct. 6, 1992.

Purchase order from Johnson & Johnson Do Brasil dated Oct. 13, 1992.

Osprey Corporation's job schedule sheet indicating final sale date Oct. 15, 1992.

Osprey Corporation's job record sheet No. 2681 dated Oct. 16, 1992.

Osprey Corporation's job sheet for the job on the Johnson & Johnson Do Brasil project showing the first day of work on the job was billed on Dec. 29, 1992.

Bill of Lading shipment of Osprey product to Johnson & Johnson.

Restriction Requirement from related U.S. Appl. No. 13/841,579, dated May 29, 2013, 8 pages.

Response to Restriction Requirement from related U.S. Appl. No. 13/841,579, dated Jun. 27, 2013, 5 pages.

Non Final Office Action in related U.S. Appl. No. 13/841,579 dated Jul. 18, 2013, 12 pages.

Response to Non Final Office Action in related U.S. Appl. No. 13/841,579 dated Oct. 18, 2013, 12 pages.

Notice of Allowance in related U.S. Appl. No. 13/841,579 dated Nov. 6, 2013, 11 pages.

Restriction Requirement in related U.S. Appl. No. 13/445,767, dated May 30, 2013, 7 pages.

Response to Restriction Requirement in related U.S. Appl. No. 13/445,767, dated Jun. 27, 2013, 5 pages.

Notice of Allowance in related U.S. Appl. No. 13/445,767 dated Jul. 22, 2013, 14 pages.

Non Final Office Action in related U.S. Appl. No. 14/060,574 dated Mar. 18, 2015, 9 pages.

Osprey Corporation, "New Top Inlet Phoenix Drum Filter System", Specification, available at least as early as Apr. 11, 2011, 2 pages.

Osprey Corporation, "Osprey Production Waste Management Systems", Specification, available at least as early as Apr. 11, 2011, 2 pages.

Osprey Corporation, "Polyfilm Scrap and Trim Collection System", Specification, available at least as early as Apr. 11, 2011, 2 pages.

Osprey Corporation, "Engineered Air Systems Solutions", Brochure, available at least as early as Apr. 11, 2011, 3 pages.

Osprey Corporation, "Dust Collection for Feminine Hygiene Product Lines", Brochure, available at least as early as Apr. 11, 2011, 2 pages.

Osprey Corporation, "9960-FS-011", Engineering Diagram, available at least as early as Apr. 11, 2011, 1 page.

Osprey Corporation, "Osprey Corporation Installation and Maintenance Manual Osprey Final Filter", Manual, available at least as early as Apr. 11, 2011, 19 pages.

Osprey Corporation, "Fluff Separation System", Brochure, available at least as early as Apr. 11, 2011, 2 pages.

Osprey Corporation, "Multi-Line Drum Filter System", Brochure, available at least as early as Apr. 11, 2011, 2 pages.

Osprey Corporation, "Osprey Order Record 6454 PGTP.com", Purchase Order, Jul. 8, 2009, 7 pages, Redacted.

Osprey Corporation, "Technical Upgrade Equipment for Existing Drum Filters", Quotation, Jul. 17, 2009, 8 pages, Redacted.

Osprey Corporation, "Osprey Patented 6-3-P Phoenix With Optional Composite Air Recycle Considerations for an Air Volume of 16,500 M3/HR-Reference Brazil's Specification", Quotation, Mar. 31, 2009, 7 pages, Redacted.

Osprey Corporation, "Osprey 48 X 60 Rotary Screen Condenser Preseparator and Patented 6-5-Pc Phoenix Filter With Composite Air Recycle Considerations—25,000 Cfm Maximum Air vol. Design", Quotation, Jan. 20, 2010, 7 pages, Redacted.

Osprey Corporation, "The Osprey Drum Filter System", Brochure, available at least as early as Apr. 11, 2011, 6 pages.

Osprey Corporation, "Phoenix Composite Filter System", Brochure, available at least as early as Apr. 11, 2011, 2 pages.

Notice of Allowance from related U.S. Appl. No. 14/858,581 dated Mar. 26, 2018, 14 pages.

* cited by examiner

FILTRATION SYSTEM AND METHOD

CROSS REFERENCE TO RELATED APPLICATIONS

This application is a continuation of U.S. patent application Ser. No. 14/858,581 filed Sep. 18, 2015 which is a continuation of U.S. patent application Ser. No. 14/060,574, filed Oct. 22, 2013, entitled FILTRATION SYSTEM AND METHOD, which is a divisional of U.S. patent application Ser. No. 13/445,767, filed on Apr. 12, 2012, entitled FILTRATION SYSTEM AND METHOD, now issued as U.S. Pat. No. 8,597,391, which is related to and claims priority benefits from U.S. Provisional Application Ser. No. 61/517,004, filed on Apr. 12, 2011, entitled FILTRATION SYSTEM AND METHOD. The '004, '767, '574, and '581 applications are hereby incorporated in their entireties by this reference.

FIELD OF THE INVENTION

The field of the invention relates in general to a rotary drum filtration system. More specifically to a multi-stage drum filter that reduces the amount of particulates that remain airborne in the filter during operation, and that uses passive-only filters after the drum filter section.

BACKGROUND

The main absorbent part of most disposable sanitary products or disposable diapers is the pad, or core. The pad is often made of wood pulp that has been fiberized by a special mill, designed to handle fluffing pulp. In the past, this pad was usually made of wood pulp. Now, it is more common that the pad is made of some combination of wood pulp and absorbent polymer. After the pulp is fiberized, the resulting pulp fluff is drawn out of the mill onto a forming screen. The pad is formed on the screen in a forming chamber, in which the pulp fluff and polymer is placed on the forming screen and is forced into a compact configuration by suction of air through the screen. After the pad is formed on the screen, it moves through a set of profiling rolls and on to the folding and packaging part of the converting machine.

The air that is pulled through the forming screen from the pulp mill contains small amounts of fiberized pulp fluff and, in many cases, absorbent polymer. Experience has shown that the amount of the waste fluff and/or polymer that comes through the forming screen is 2% or 3% of the total amount of fluff and/or polymer that enters the forming chamber.

Several filters have been developed for filtering the waste particulates out of the air exiting the forming chamber. These filters have several advantages. First, the filters clean the air that comes from the forming screen and return the air to the plant area or vent the air outside of the plant.

Second, the waste particulates that come through the forming screen are recovered and returned to the mill or forming chamber. The recovered particulates that are returned to the process represent a substantial cost savings to the manufacturer.

For uniform pad formation to take place in the forming chamber, the volume of air moving through the forming chamber and the pressure of that air should be consistent. If the air volume or pressure is changed, the pad will have different thicknesses and absorbencies and may not meet specification. By assisting in moving air through the forming screen, a properly-constructed filter can help to assure air volume and air pressure consistency through the forming chamber.

One of the filters that is used for removing the waste pulp particulates from the air that moves through the forming screen is the rotary drum variety, such as is depicted in FIG. 1. In many cases, when the air contains large quantities of waste particulates, conventional rotary drum filters, when used as a first stage filter, quickly become loaded and undergo severe drops in efficiency. In these cases, the air may first pass through a pre-separator, such as a cyclone, condenser, etc., to remove larger and/or heavier particulates prior to the rotary drum filter stage.

As can be seen in FIG. 1, the process air from the forming chamber of the production machine with the waste particulates entrained are fed through a conduit 12 into a drum filter enclosure 14. The conduit 12 may feed the air and entrained waste particulates to the filter enclosure 14 from the top as shown or may deposit the air and entrained waste particulates from the forming chamber at an opening along the bottom of the filter enclosure 14. A rotary drum 16, which includes a filtration media 18 along its outside, rotates within the drum filter enclosure 14. One end of the rotary drum 16 is closed off (not shown in FIG. 1). The other end of the drum opens to a compartment (not shown in FIG. 1) which houses one or more clean air, or main, fans for withdrawing the air from the filter enclosure 14. The main fan (not shown in FIG. 1) is used to pull air through the filtration media 18 and then through the open end of the drum 16.

As the drum 16 rotates and as the clean air is pulled through the medium 18, particulates 19 settle on the filtration media 18. These particulates 19 are vacuumed off the filtration media 18 through a suction nozzle 20 by a purge fan 22. This fan 22 and another conduit 24 then route the particulates 19 back to the production line and/or to an offline collection system for disposal. The clean air, which is pulled through the filtration media 18 by the fans of the system, is returned to the plant area or is exhausted outside the plant.

The clean air fan, or main fan, is used at the open end of the rotary drum filter for pulling the particulates onto forming screen, pulling the waste particulates to the filter enclosure, and pulling the waste particulates onto the filtration media 18 of the drum filter. In addition, a material handling fan may be used to move the forming air and particulates from the mill through the forming chamber. The material handling fan, also known as a forming fan, is located on the conduit 12 extending from the forming chamber to the drum filter.

The drum filter enclosure generally can only handle approximately 12 inches water column (wc) of negative pressure. The material handling fan must be used if the forming chamber requires more than 8 inches wc of negative pressure. If a material handling fan is used in the forming chamber, then the fan at the rear end of the drum filter, or the clean air fan, is used as a balancing fan to keep the filter under a negative pressure. Because increasing forming chamber pressure is a common requirement of sanitary products machine manufacturers, material handling fans are often used to generate the required high pressures and volumes in a system. In such systems, the clean air fan located at the end of the rotary drum filter serves mainly as a balancing fan to keep the filter under negative pressure.

One of the problems found in the rotary drum filter systems is that waste particulates 19 have a tendency to accumulate in bottom corners 26 of the filter enclosure 14. Because of gravity, the waste particulates 19 have a tendency to remain in these corner areas. Further particulates 19 stick to the accumulated particulates, and the problem is compounded. Manufacturers are often forced to shut down the line and clean out this particulate accumulation.

One manner of avoiding particulate accumulation in the corners 26 is by providing a baffle 28 in the corner of the enclosure to decrease the area in which particulates 19 can accumulate. Another method of preventing some of the particulate accumulation utilizes placement of the conduit 12 at the bottom of the enclosure 14. In this manner, a turbulent blast of air is created at the bottom of the filter enclosure, which somewhat prevents the accumulation of particulates 19 on the floor in places in direct contact with the turbulent air stream. At least one manufacturer has utilized more than one inlet across the bottom of the chamber in order to create an even more turbulent air flow. However, it has been found that this solution, even when used with a baffle, does not adequately solve the particulate accumulation problem.

Particulate accumulation can cause other problems in a filter system other than noncleanliness. The particulates 19 within the enclosure can act as fuel for a fire, or "explosion." Manufacturers have set limits for the amount of particulates 19 per unit volume that they consider a safe amount to be in the enclosure 14 at a given time. This limit is often referred to as the "lower explosion limit," or "LEL," and varies among different manufacturers. The limit is also referred to as the "lower flammability limit ("LFL")." Calculation of the limit may or may not include the particulates 19 located on the outside of the filtration media 18. However, regardless of the limit set, the particulates 19 accumulated at the bottom of the enclosure 14 and at the corners 26 of the enclosure is included in the calculation.

To prevent any possible explosions in a filter enclosure from spreading to other parts of a plant, manufacturers often provide explosion vents (not shown) at the top of the enclosure 14. The explosion vents open when a certain pressure is built up within the enclosure 14. The vent provides an escape for igniting gases, and prevents an explosion from spreading to all parts of a plant. The explosion vent typically leads to a duct, which is vented to the outside of the plant. The duct usually leads from the explosion vent at the top of the enclosure up to and through the roof of the manufacturer's facility. The structure and installation of the explosion vent and its duct work can often be more elaborate and more expensive than the filter enclosure 14. Thus, manufacturers have searched for ways to avoid having to provide these explosion vents.

In some cases, it is necessary to add additional filter stages after the primary rotary drum filter stage to achieve the required air purity level. A multi-stage drum filter may be used in these cases. The type and quantity of additional filter stages can vary. Examples of filter stages include self-cleaning filter stages and passive filter stages. A self-cleaning filter is usually a filter that has an automatic method for cleaning itself without operator intervention. A passive filter typically refers to any filter that does not have self-cleaning capabilities, and usually refers to a pocket or bag filter. One advantage of passive filters is the ability to capture particulates within the pockets or bags, which keeps the particulates out of the airstream. As a result, the level of particulates are more easily maintained below the LEL, which helps minimize the risk of explosion in the passive filter stages. Passive filters are typically less expensive than self-cleaning filters because they do not require any type of automated self-cleaning machinery, but may not be feasible for use in processes where the air leaving the primary rotary drum filter stage has high concentrations of dust because the passive filters may become clogged quickly and require frequent maintenance and/or replacement.

As a result, for processes with relatively high dust concentrations remaining in the air following the rotary drum filter stage, a self-cleaning filter stage is commonly used after the primary rotary drum filter stage because the periods between maintenance events is often longer for a self-cleaning filter than for a passive filter in this type of environment.

The most common types of self-cleaning filters used for the filter stage after the primary rotary drum filter stage are cartridge final filters or disk filters. Cartridge final filters use a bank of cartridge filters that are periodically cleaned with a burst of compressed air. This compressed air cleaning is controlled by a control panel, which is activated based on the amount of pressure drop across the cartridges. When the pressure drop across the cartridges reaches a certain level, which has been set to indicate that the cartridges are dirty, the compressed air cleaning cycle is automatically initiated. However, when the compressed air cleaning cycle is initiated, the particulates are blown away from the cartridges and re-entrained into the air. As a result, it is difficult to control the level of particulates below the LEL with the cartridge final filters, which can increase the risk of explosion in the self-cleaning filter stages.

A disk filter is typically a secondary rotary drum filter stage that is positioned after the primary rotary drum filter stage. This secondary rotary drum filter stage is often shorter in length than the primary rotary drum filter stage, but the operational principles and features are the same as those for the primary rotary drum filter stage.

Therefore, in order to minimize costs and maximize efficiency of the multi-stage drum filter system, as well as avoiding the potential explosion risks that may be introduced by cartridge final filters, it is desirable to have a passive filter located in the second stage after the primary rotary drum filter stage, instead of a self-cleaning filter. As a result, it may be desirable to improve the efficiency of the primary drum filter stage so that the air leaving this stage has a lower concentration of dust that must be processed by the passive filters. It is also desirable to improve the performance of the primary rotary drum filter stage so that a pre-separator stage prior to the rotary drum filter stage is not required. Alternatively and/or additionally, it may be desirable to improve the holding capacity of the passive filters in the second stage so that the periods between maintenance and/or replacement are extended.

SUMMARY

Various embodiments of the invention relate to a multi-stage drum filtration system comprising a primary rotary drum filter stage, at least one passive filter stage coupled to an outlet side of the primary rotary drum filter stage, and a main fan coupled to the stages and configured to create a vacuum on an inlet side of the primary rotary drum filter stage. The multi-stage drum filtration system may further comprise a second passive filter stage. The multi-stage drum filtration system may further comprise a HEPA filter stage coupled to an outlet side of the at least one passive filter stage.

In certain embodiments, the multi-stage drum filtration system may also further comprise a pressure sensor positioned adjacent the inlet side of the primary rotary drum filter stage, and a controller connected to the pressure sensor and the main fan and configured to receive input from the pressure sensor and transmit a speed signal to the main fan. The controller may be configured to control a speed of the main fan to maintain an inlet vacuum to the primary rotary drum filter stage that corresponds to an inlet vacuum set point input. A variable frequency drive may be connected to the main fan, wherein the variable frequency drive receives the speed signal from the controller, converts the speed signal into a new speed signal, and transmits the new speed signal to the main fan.

The primary rotary drum filter stage may comprise a rotary drum and filtration media. In some embodiments, the filtration media is configured to achieve a pressure differential between 0.5-1.5 inches at 100 ft/min face velocity when the filtration media is clean and between 1.0-4.0 inches at 100 ft/min face velocity when the filtration media 122 is loaded. A seal may be positioned between an open end of the rotary drum and an enclosure wall between the primary rotary drum filter stage and the first passive filter stage, wherein the seal may comprise a non-overlapping seam, and wherein the seal is held in position adjacent the enclosure wall via a mechanical stop.

The at least one passive filter stage may comprise a plurality of individual filters, wherein each individual filter may comprise a minimum filter efficiency of at least MERV 8 per ASHRAE 52.2. Likewise, the second passive filter stage comprises a plurality of individual filters, wherein each individual filter may comprise a minimum filter efficiency of at least MERV 8 per ASHRAE 52.2. Finally, the HEPA filter stage comprises a plurality of individual filters, wherein each individual filter is rated for 2000 CFM at 1.4 inches water gauge ("w.g.").

DETAILED DESCRIPTION

Figure 1:
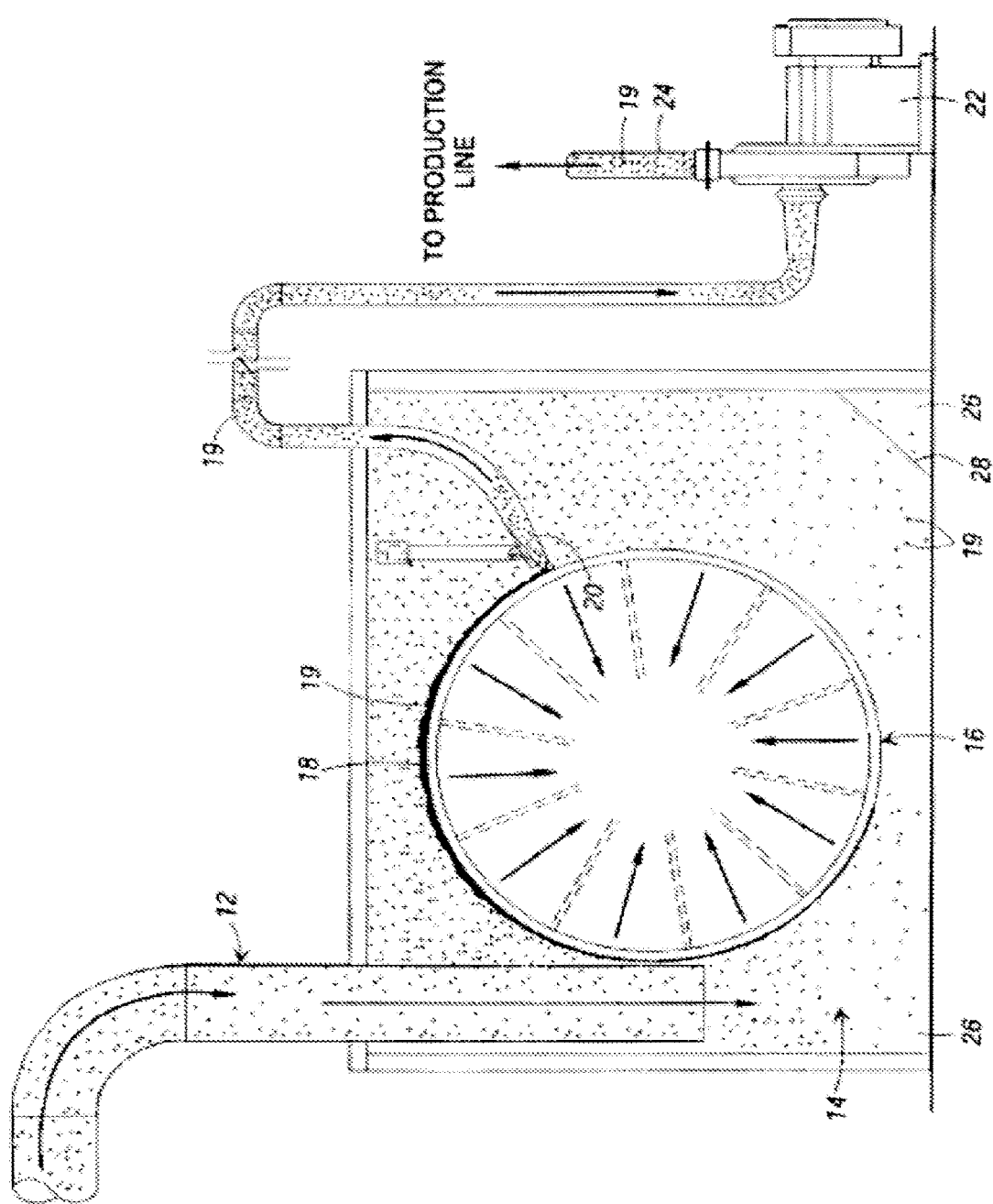
FIG. 1 is a side view of a prior art rotary drum filter, with part of the enclosure removed.

Embodiments of the invention provide a multi-stage drum filtration system and method of use. While the multi-stage drum filtration system and method of use are discussed for use with fiberized particulates, they are by no means so limited. Rather, embodiments of the multi-stage drum filtration system may be used with any type of manufacturing system that generates any type of particulates that need to be removed and reclaimed from process air or otherwise as desired.

FIGS. 2-18 illustrate embodiments of a multi-stage drum filtration system 100. In some embodiments, the filtration system 100 may comprise a primary rotary drum filter stage 102, a first passive filter stage 104, a second passive filter stage 106, and/or a HEPA filter stage 108.

Figure 2:
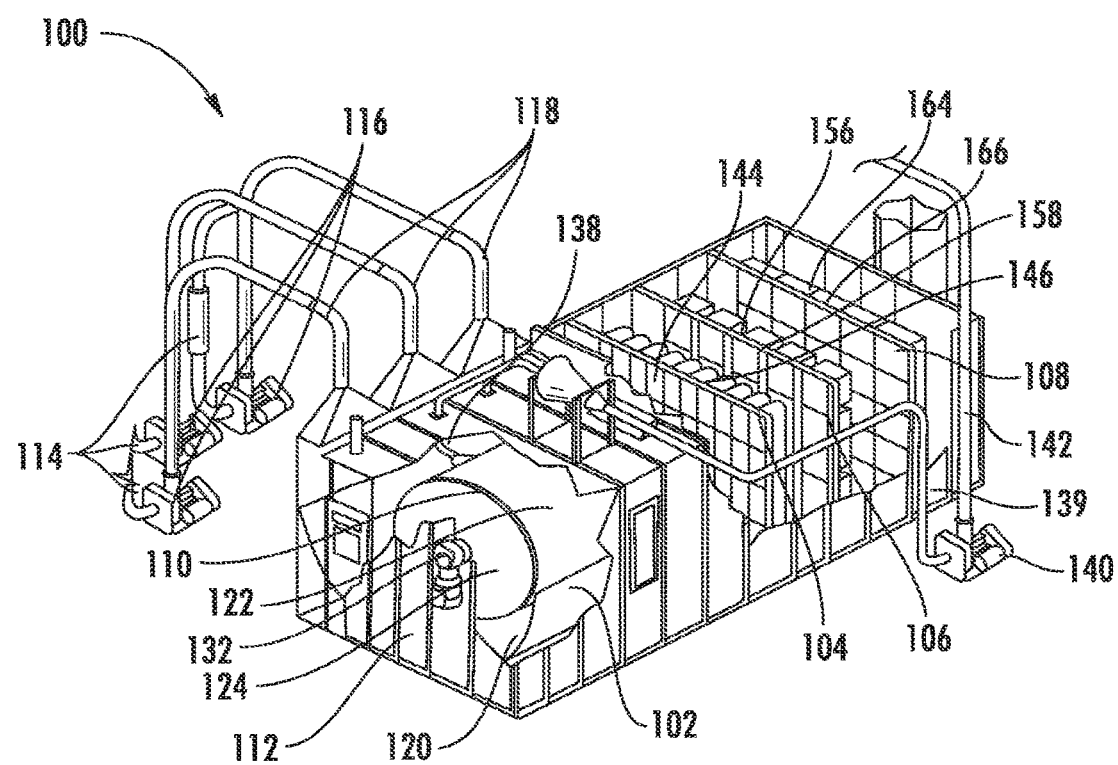
FIG. 2 is a perspective view of a multi-stage drum filtration system according to certain embodiments of the present invention.
Figure 3:
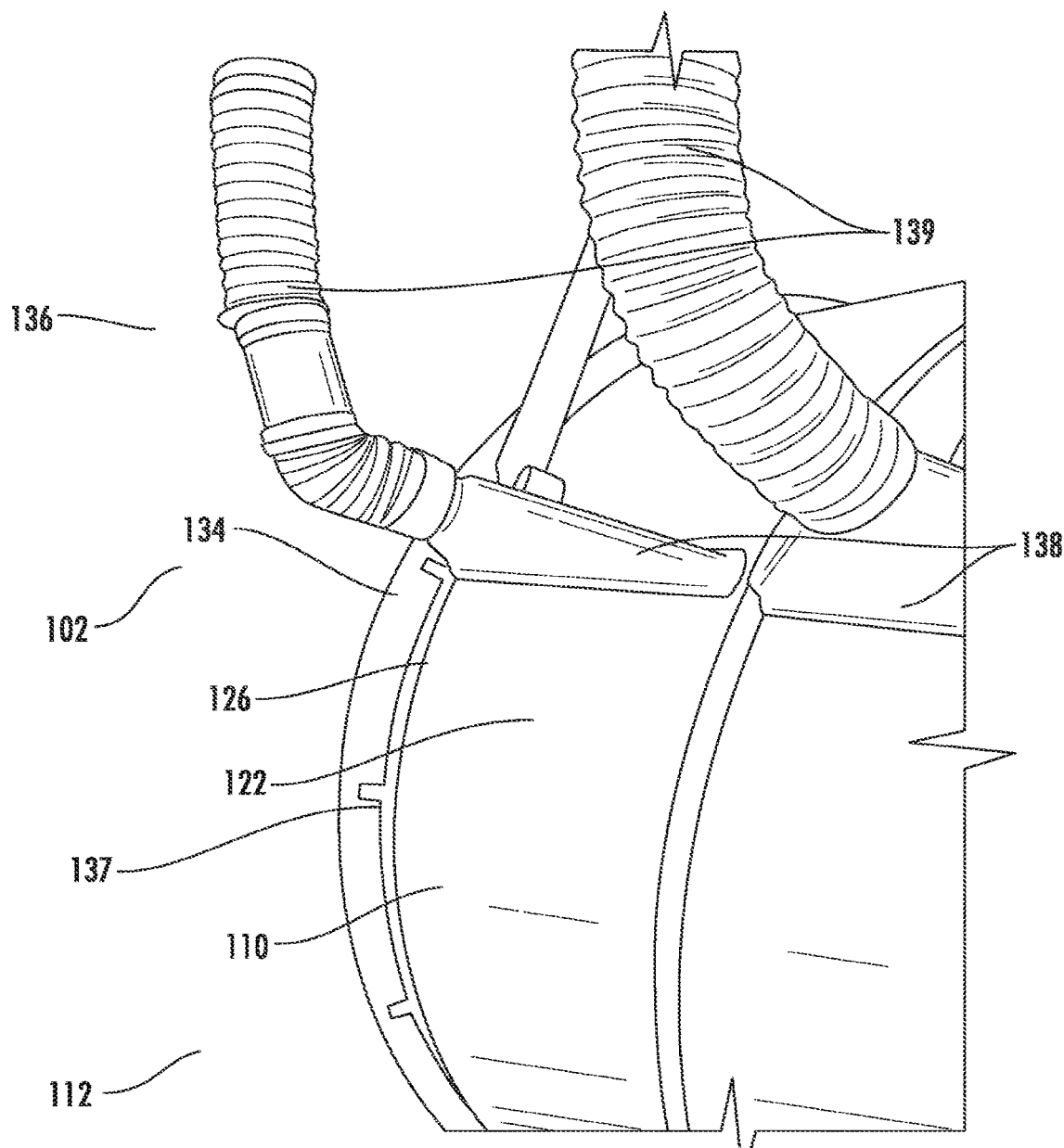
FIG. 3 is a partial perspective view of a rotary drum and suction nozzles used in conjunction with the multi-stage drum filtration system of FIG. 2.

In these embodiments, as best illustrated in FIGS. 2-3, the primary rotary drum filter stage 102 may comprise a rotary drum 110 and a filter enclosure 112 that is coupled to the manufacturing process. In these embodiments, the primary rotary drum filter stage 102 may be the first filtration stage of the multi-stage drum filtration system 100, such that the process air does not pass through a pre-separator or other type filter prior to entering the primary rotary drum filter stage 102. The process air containing the particulates may be fed through a conduit 114 into a forming fan 116. The forming fan 116 may be used to help move the air and particulates from the manufacturing process through a forming chamber and into the filter enclosure 112.

In these embodiments, the forming fan 116 may be configured to blow the air and particulates through a conduit 118, herein referred to as a forming fan transition 118, into the filter enclosure 112 at a point near a floor 120 of the filter enclosure 112. The floor 120 may be curved, or concave, and extend at least a portion of the way up one side of the filter enclosure 112 opposite the forming fan transition 118.

In some embodiments, the rotary drum 110 may have a diameter ranging from 4 feet to 10 feet, but may have other suitable diameters as needed depending on the volume of air and the concentration of particulates to be removed. The rotary drum 110 typically rotates within the filter enclosure 112 at speeds ranging from 4 to 6 RPM, but may rotate at other speeds as needed depending on the volume of air that is flowing into the filter enclosure 112 and the concentration of particulates within the air.

Figure 4:
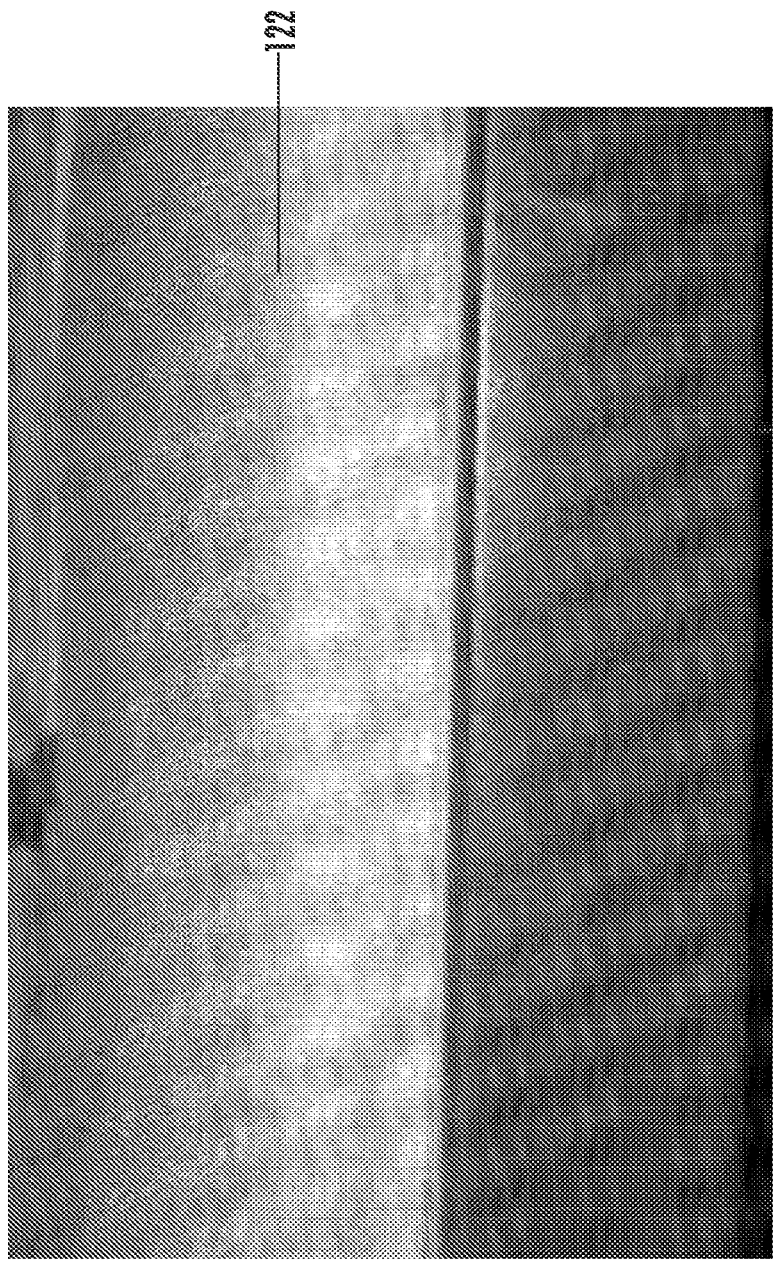
FIG. 4 is a photograph showing a side view of filtration media used in conjunction with the multi-stage drum filtration system of FIG. 2.
Figure 5:
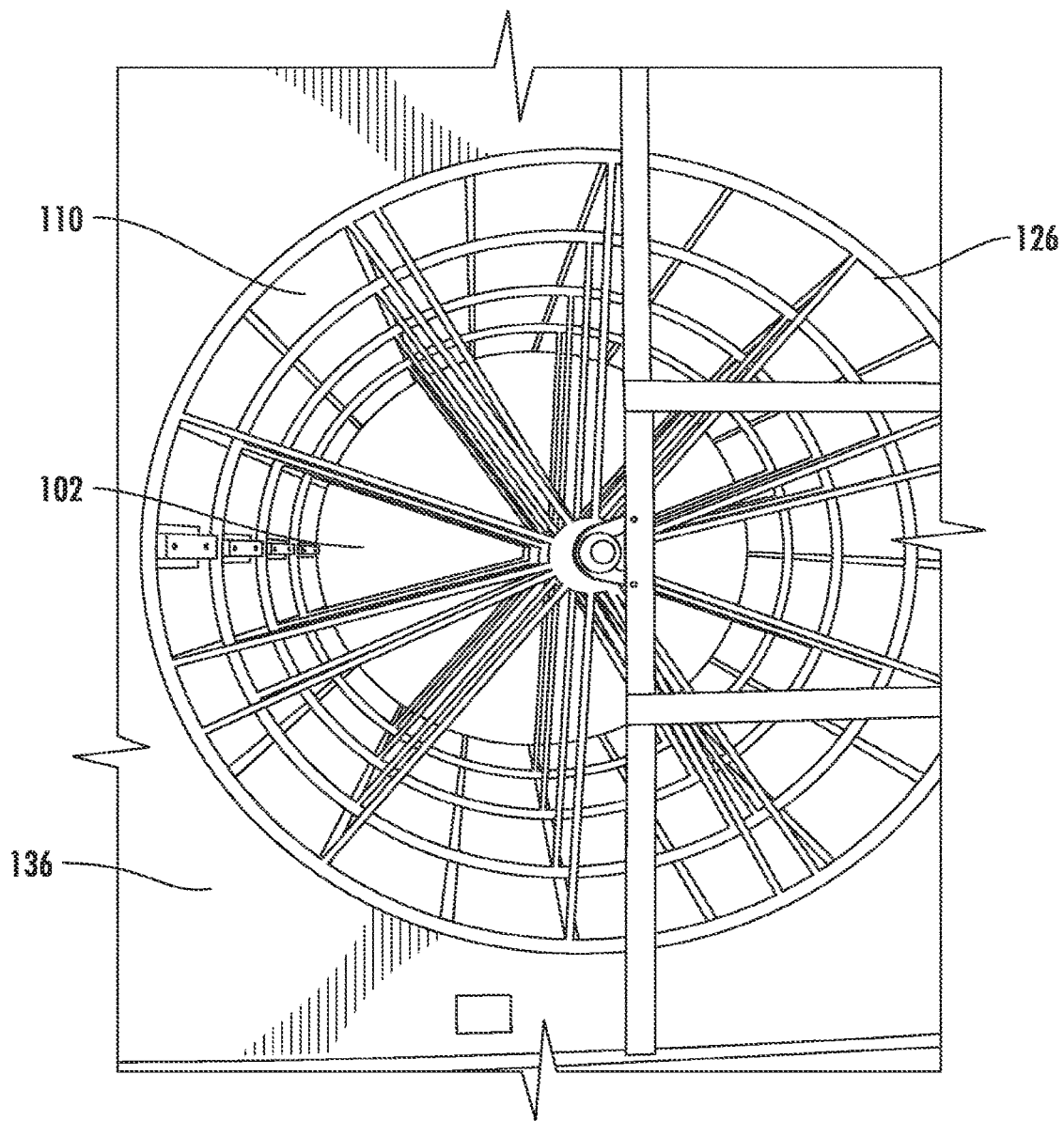
FIG. 5 is a front perspective view of an open end of a rotary drum used in conjunction with the multi-stage drum filtration system of FIG. 2.

In some embodiments, as shown in FIGS. 2-4, the rotary drum 110 is covered with a filtration media 122. The filtration media 122 most often used is a knit material that has a woven acrylic backing, and polyester fibers. A side view of the edge of an embodiment of the filtration media 122 is shown in FIG. 4. However, one of skill in the relevant art will understand that any suitable materials may be used to form the filtration media 122 that achieves a pressure differential that ranges between 0.5" and 1.5" at 100 ft/min face velocity when the filtration media 122 is new, to 1.0" to 4.0" at 100 ft/min face velocity when the filtration media 122 is dirty (loaded).

In these embodiments, the filtration media 122 is more efficient at removing dust from the airstream than conventional filtration media used in combination with the rotary drum 110. This higher efficiency has been achieved primarily by increasing the density of fibers in the filtration media 122. The density of the filtration media 122 in these embodiments is 4 oz per square foot, whereas conventional filtration media typically average 2.6 oz per square foot. The filtration media 122 in these embodiments is available in pile heights that range from ½" to 1". The minimum efficiency rating of the filtration media 122, per ASHRAE standard 52.2, is at least MERV 8, and may be at least MERV 10, but filtration media 122 with a higher MERV rating may also be used.

In some embodiments, as best illustrated in FIGS. 2-3, 5, and 16, a first end 124 of the rotary drum 110 may be closed off, and a second end 126 may be to a fan duct 128 leading to a balancing, or main fan 130, and/or additional filter stages 104, 106, and/or 108. The main fan 130 may be configured to move air through the second end 126 of the rotary drum 110 and therefore through the filtration media 122 in these embodiments. The rotary drum 110 may be rotated by a drive motor 132, as shown in FIG. 2.

In some embodiments, as best illustrated in FIG. 3, the primary rotary drum filter stage 102 may include a seal 134 between the rotary drum 110 and a stationary enclosure wall 136, which is the wall located adjacent the second end 126 of the rotary drum 110. The seal 134 reduces the amount of dust that leaks past the primary rotary drum filter stage 102. In some embodiments, the seal 134 may be formed of composite materials, fabric, and rubber-based materials, but other similar suitable materials may also be used. In some embodiments, the seal 134 may comprise multiple layers of materials that are positioned over one another and/or may be integrally formed or adhered to one another. The seal 134 may be held in place by a mechanical stop 137, which is positioned to hold the seal 134 in place adjacent the stationary enclosure wall 136.

In certain embodiments, a non-overlapping seam (i.e., a butt seam) may be used to form the seal 134, wherein ends of the seal 134 are placed in contact with one another without any overlap. The ends of the seal 134 may be joined via any suitable mechanical or chemical fasteners, including but not limited to adhesives, adhesion welding, splice tape, or other suitable mechanisms. This type of joint allows the seal 134 to maintain a consistent thickness along its circumference, which may result in a tighter seal between the primary rotary drum filter stage 102 and the first passive filter stage 104. In other embodiments, the seal 134 may be continuous so that no seam is included along its circumference. In yet other embodiments, an overlapping seam may be used to form the seal 134, wherein one end of the seal 134 is positioned over another end of the seal 134 so that the two ends are in overlapping contact. The two overlapping ends of the seal 134 may be joined via any suitable mechanical or chemical fasteners, including but not limited to adhesives, adhesion welding, splice tape, or other suitable mechanisms. One of ordinary skill in the relevant art will understand that any suitable seal may be used between the rotary drum 110 and the stationary enclosure wall 136 that limits the amount of dust that leaks past the primary rotary drum filter stage 102.

Figure 6:
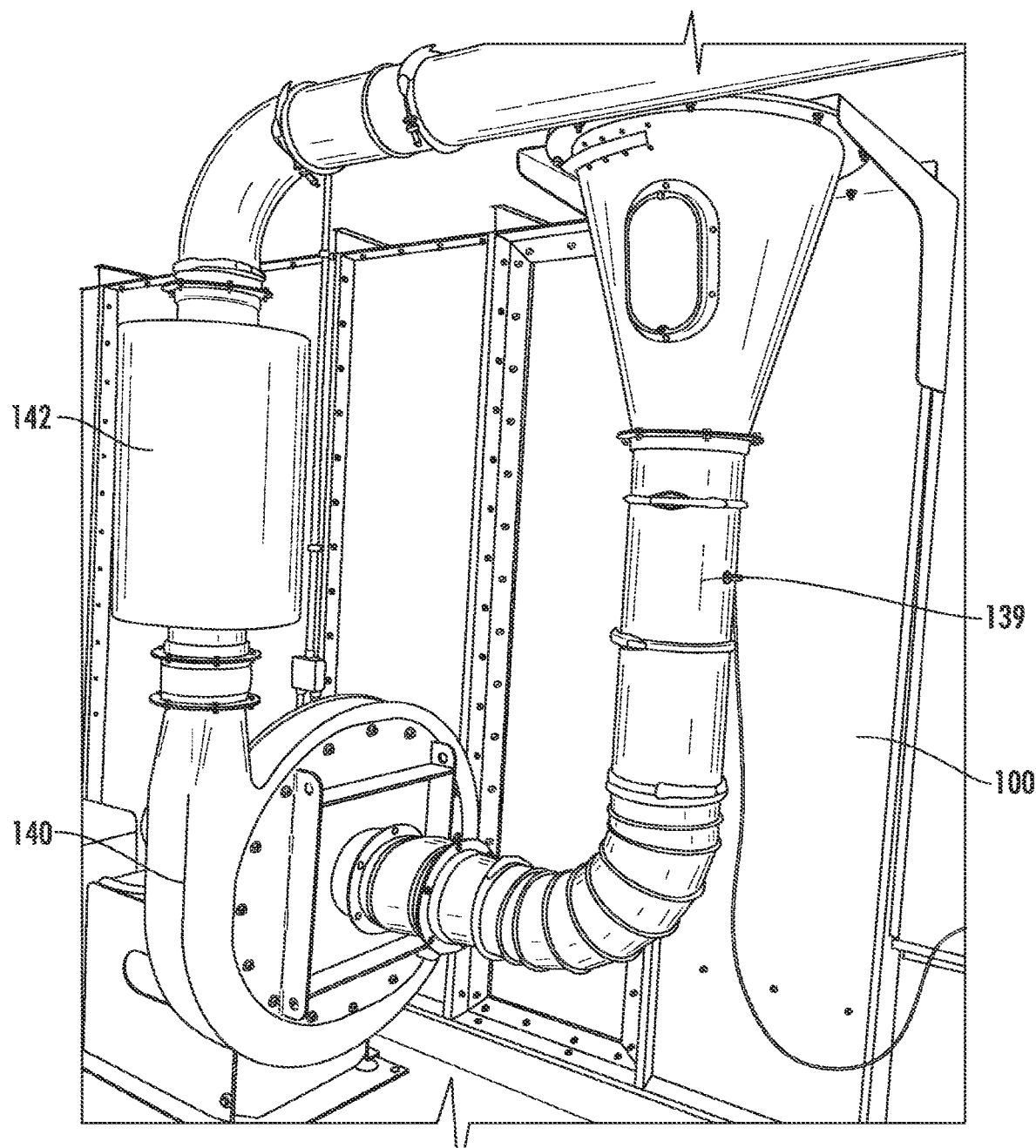
FIG. 6 is a perspective view of a purge fan used in conjunction with the multi-stage drum filtration system of FIG. 2.

In some embodiments, as illustrated in FIGS. 2-3 and 6, at least one suction nozzle 138 is located along one side of the rotary drum 110 for removing the particulates as they accumulate on the surface of the filtration media 122. In some embodiments, a plurality of suction nozzles 138 may be used with the primary rotary drum filter stage 102. However, one of ordinary skill in the relevant art will understand that any suitable suction nozzles 138 or other similar devices, in any location or combination, may be used to remove the particulates from the surface of the filtration media 122. In these embodiments, a return conduit 139 may lead from the suction nozzles 138 to a nozzle suction fan 140, or purge fan 140. The purge fan 140 and another conduit 142 may be configured to route the recovered particulates back to the manufacturing process. The rating of the purge fan 140 should be sized properly to overcome the increased density of the filtration media 122. It is desirable for the purge fan 140 to generate at least −35" of vacuum pressure at the suction nozzle 138 inlet for filter cleaning.

The design of the forming fan transition 118 and the rounded floor 120 of the filter enclosure 112, as well as the process for removing particulates from the filter enclosure 112 are described in detail in U.S. Pat. No. 5,679,136, the entire contents of which are incorporated herein by reference.

In some embodiments, the primary rotary drum filter stage 102 serves as the first stage of removing particulates from the air. Once the air has passed through the filtration media 122 and exited the second end 126 of the rotary drum 110, the air then passes through one or more passive filter stages 104, 106 and/or the HEPA filter stage 108.

Figure 7:
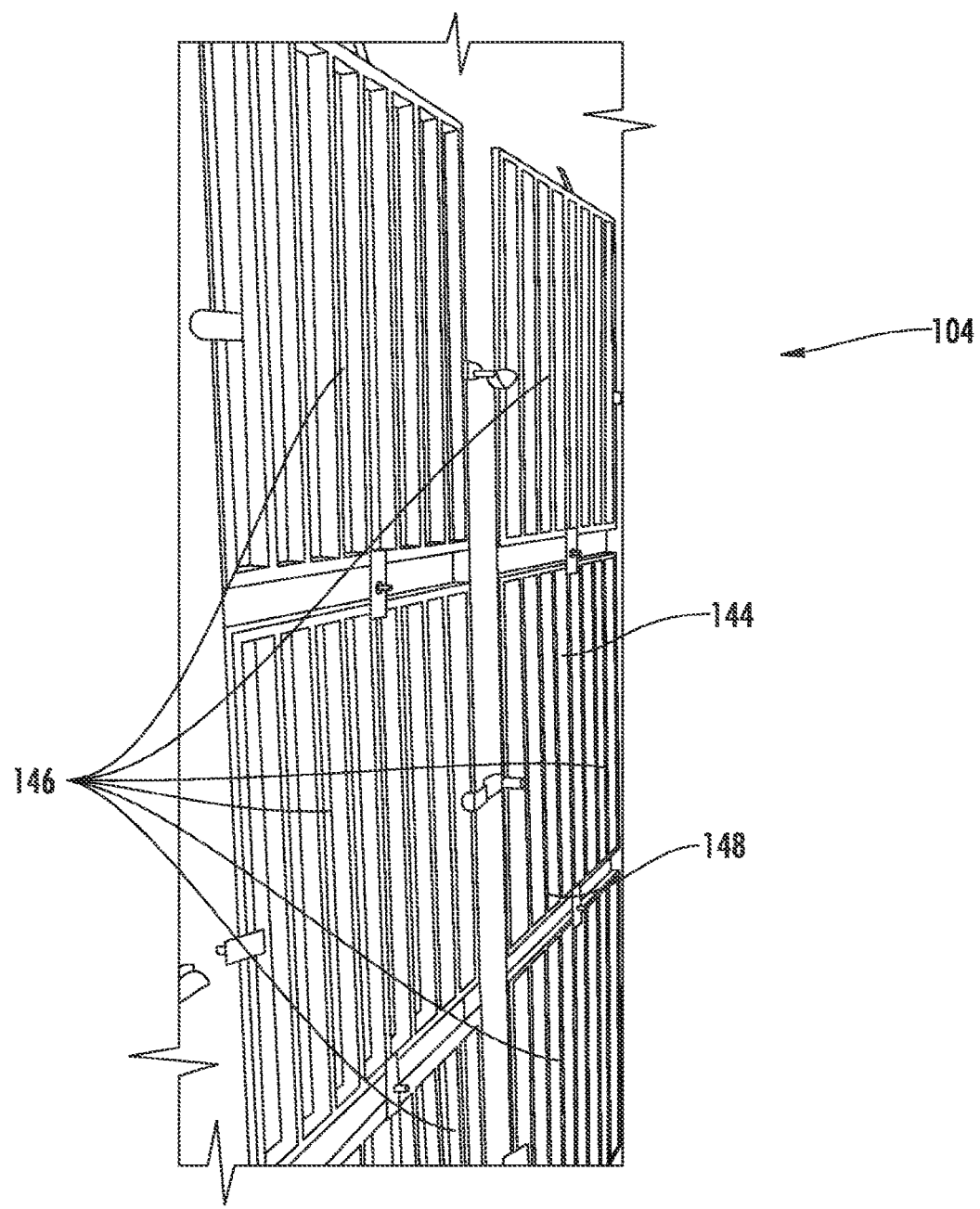
FIG. 7 is a perspective view of an inlet side of a first passive filter stage used in conjunction with the multi-stage drum filtration system of FIG. 2.
Figure 8:
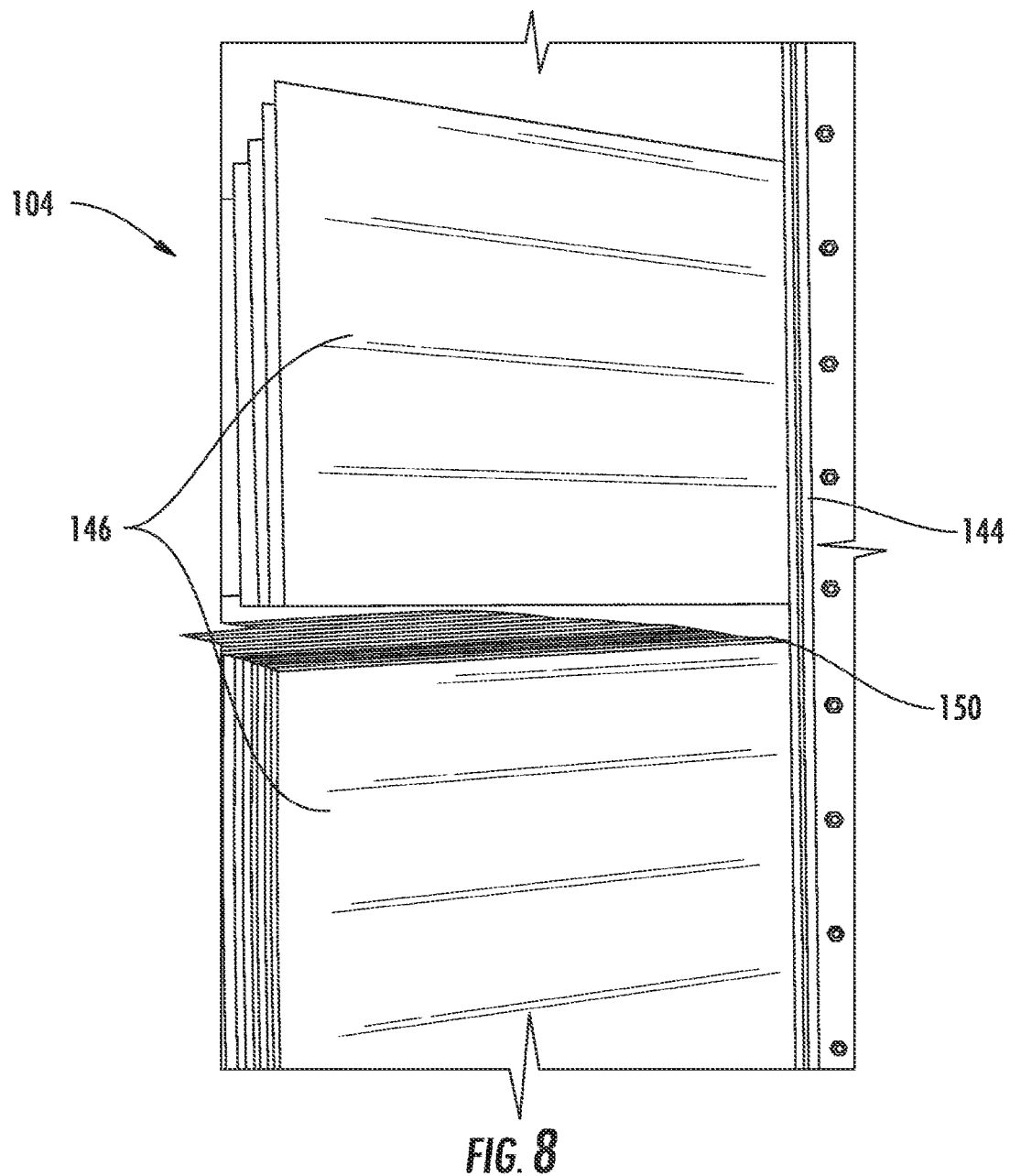
FIG. 8 is a perspective view of an outlet side of the first passive filter stage of FIG. 7.
Figure 9:
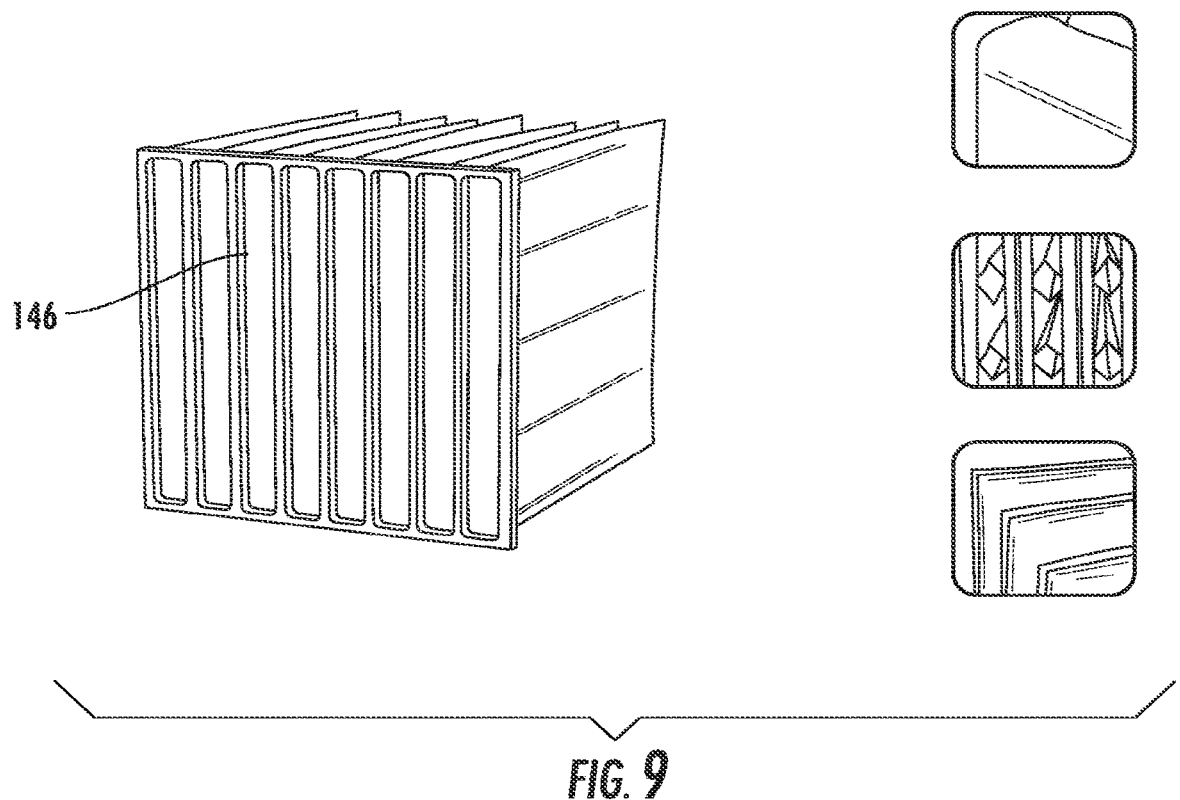
FIG. 9 are perspective and close-up views of a filter used in conjunction with the first passive filter stage of FIG. 7.

In some embodiments, as shown in FIGS. 2 and 7-8, the first passive filter stage 104 comprises a bank 144 of multiple individual pocket filters 146. In these embodiments, the air may enter the first passive filter stage 104 via an inlet side 148 of the first passive filter stage 104, as illustrated in FIG. 7, and exit via an outlet side 150 of the first passive filter stage 104, as illustrated in FIG. 8. In some embodiments, each individual filter 146 may have a configuration as shown in FIG. 9, wherein each filter 146 is 24"×24"×26" deep, but may have other suitable dimensions as needed to provide sufficient filtration and particulate removal of the airstream exiting the primary rotary drum filter stage 102. In certain embodiments, the minimum filter efficiency, per ASHRAE 52.2, is at least MERV 8, and may be at least MERV 10. However, one of ordinary skill in the relevant art will understand that filters with different MERV ratings can be used when necessary. Each filter 146 may be rated for at least 2000CFM, but other suitable ratings may be used as needed. The quantity of filters 146 required in the filter bank 144 is calculated from the total airflow volume through the primary rotary drum filter stage 102.

In these embodiments, as illustrated in FIG. 9, pocket filters 146 may be used that have depth-loading characteristics that enable each filter 146 to hold more dust than the pocket filters that are traditionally used. One of ordinary skill in the relevant art will understand that any suitable passive filter may be used in this stage that provides the desired particulate removal and capacity to efficiently handle the level of dust concentration leaving the primary rotary drum filter stage 102.

Figure 10:
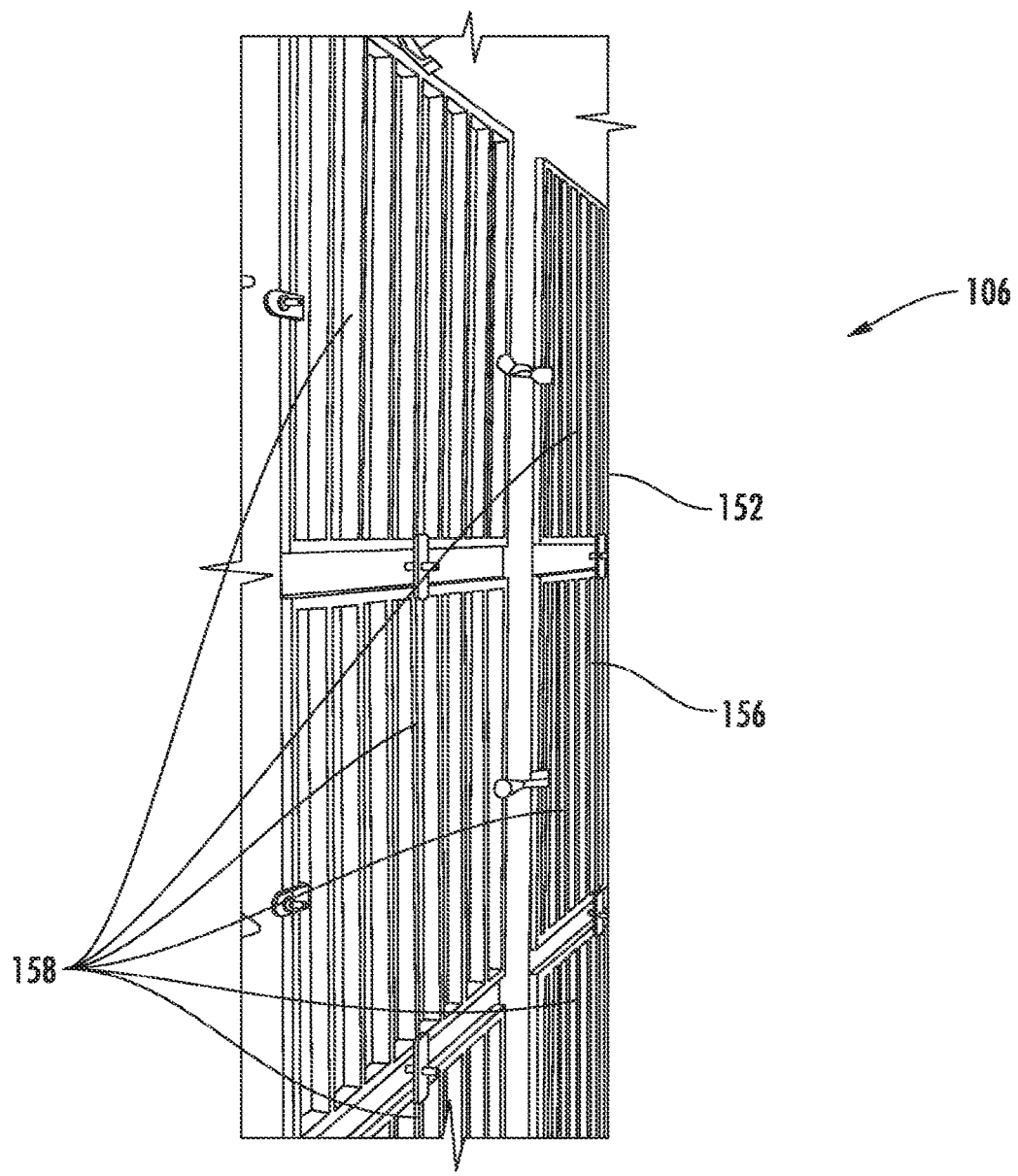
FIG. 10 is a perspective view of an inlet side of a second passive filter stage used in conjunction with the multi-stage drum filtration system of FIG. 2.
Figure 11:
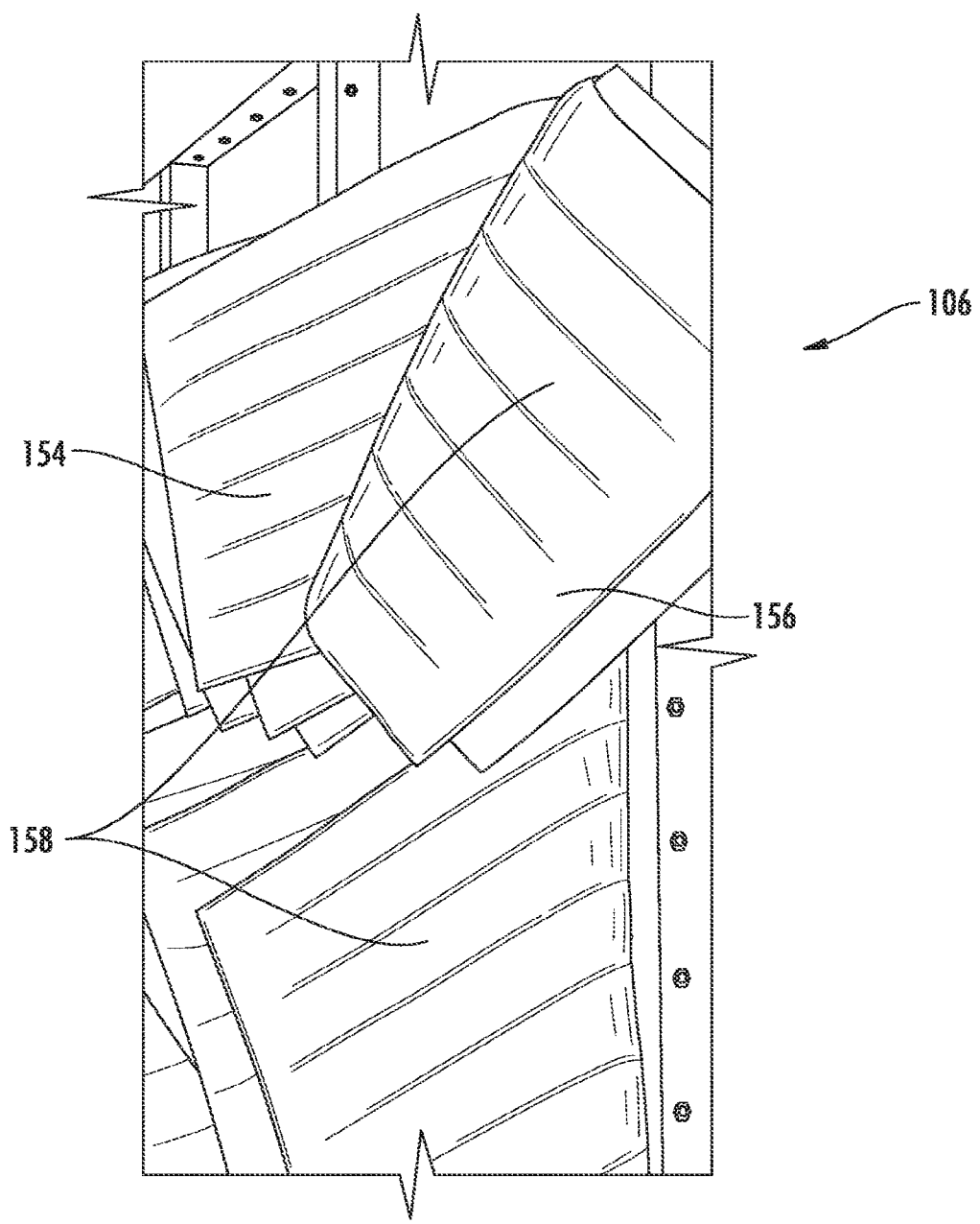
FIG. 11 is a perspective view of an outlet side of the second passive filter stage of FIG. 10.
Figure 12:
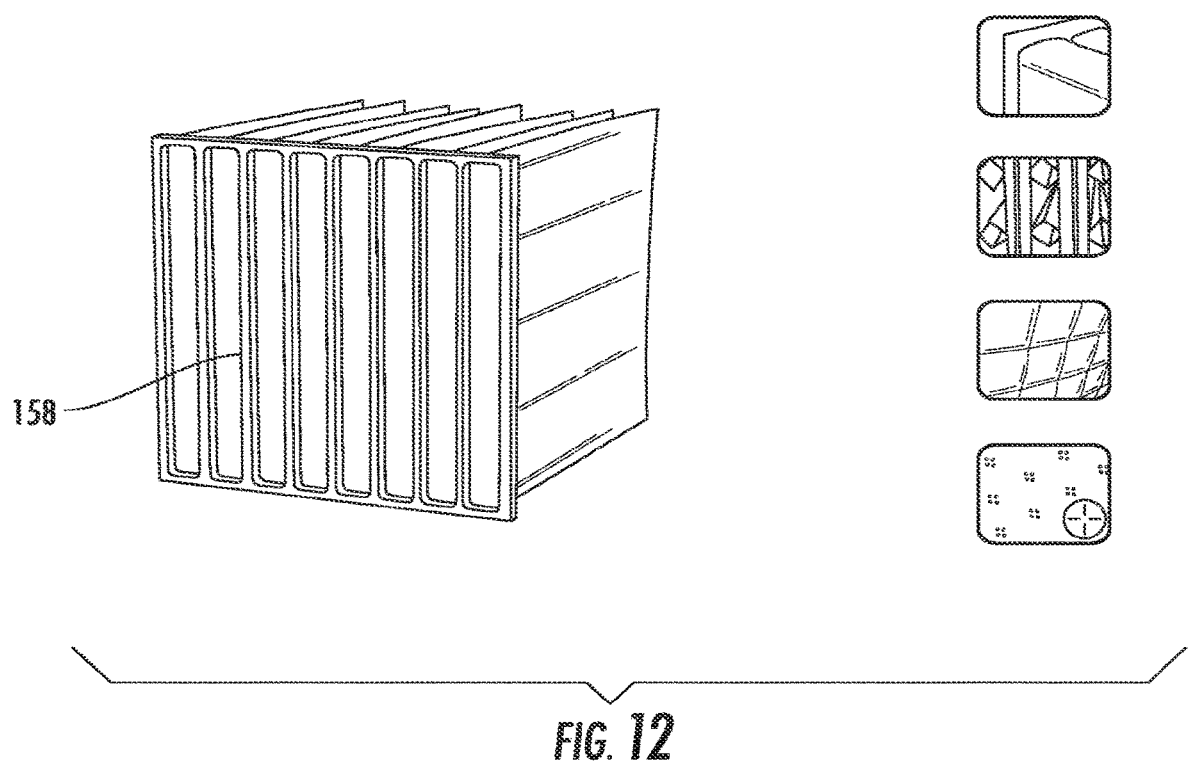
FIG. 12 are perspective and close-up views of a filter used in conjunction with the second passive filter stage of FIG. 10.

In some embodiments, as shown in FIGS. 2 and 10-11, once the air has passed through the first passive filter stage 104 and exited the outlet side 150, the air may then pass through the second passive filter stage 106. In these embodiments, the air may enter the second passive filter stage 106 via an inlet side 152 of the second passive filter stage 106, as illustrated in FIG. 10, and exit via an outlet side 154 of the second passive filter stage 106, as illustrated in FIG. 11. In some embodiments, the second passive filter stage 106 comprises a bank 156 of multiple individual pocket filters 158. Each individual filter 158 may have a configuration as shown in FIG. 12, wherein each filter 158 is 24"×24"×26" deep, but may have other suitable dimensions as needed to provide sufficient filtration and particulate removal of the airstream exiting the first passive filter stage 104. In certain embodiments, the minimum filter efficiency, per ASHRAE 52.2, is at least MERV 8, and may be at least MERV 14. However, one of ordinary skill in the relevant art will understand that filters with different MERV ratings can be used when necessary. Each filter 158 may be rated for at least 2000CFM, but other suitable ratings may be used as needed. The quantity of filters 158 required in the filter bank 156 is calculated from the total airflow volume through the primary rotary drum filter stage 102.

In these embodiments, as illustrated in FIG. 12, the pocket filters 158 may have depth-loading characteristics that enable each filter 158 to hold more dust than the pocket filters that are traditionally used. One of ordinary skill in the relevant art will understand that any suitable passive filter may be used in this stage that provides the desired particulate removal and capacity to efficiently handle the level of dust concentration leaving the first passive filter stage 104.

Figure 13:
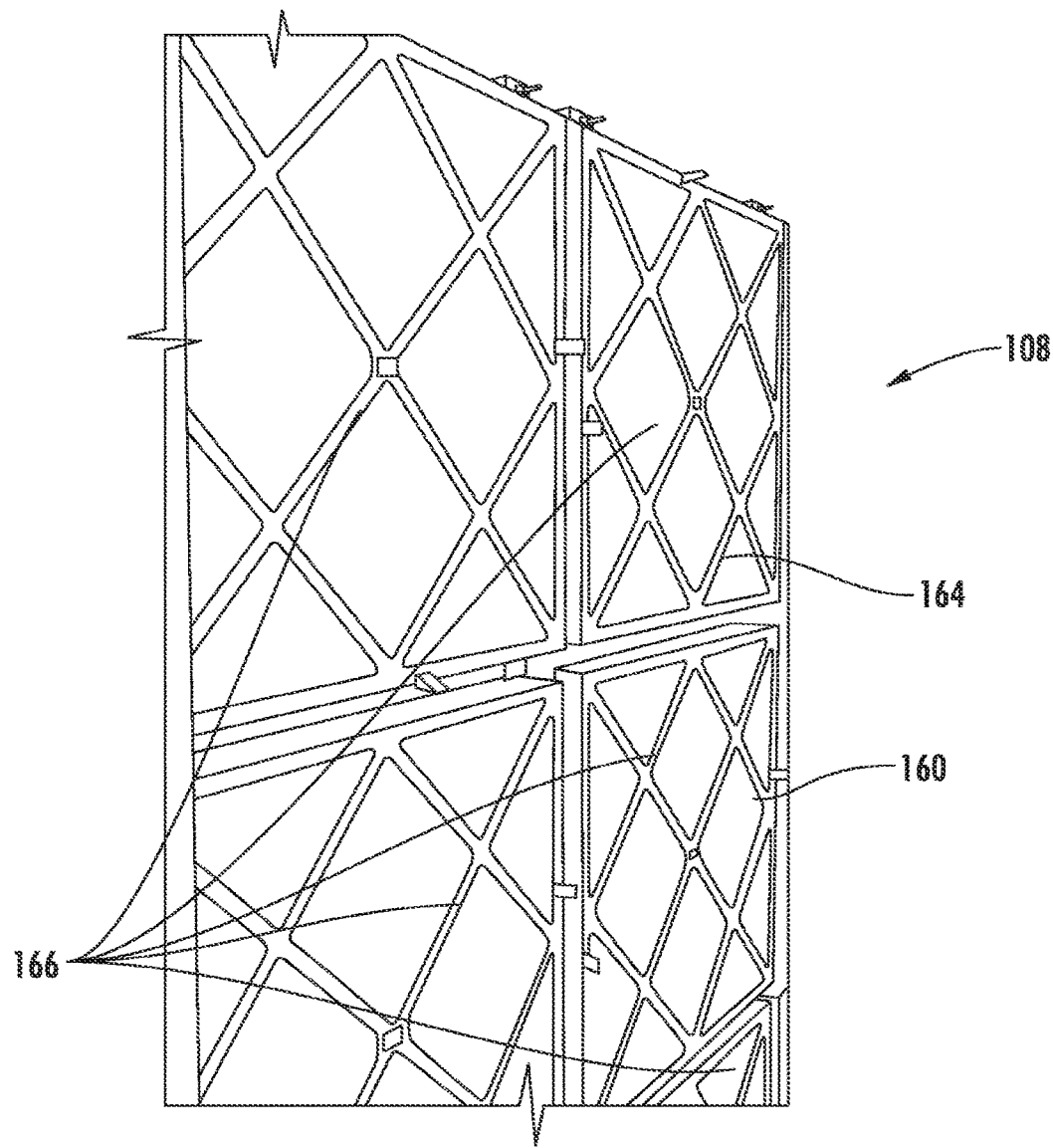
FIG. 13 is a perspective view of an inlet side of a HEPA filter stage used in conjunction with the multi-stage drum filtration system of FIG. 2.
Figure 14:
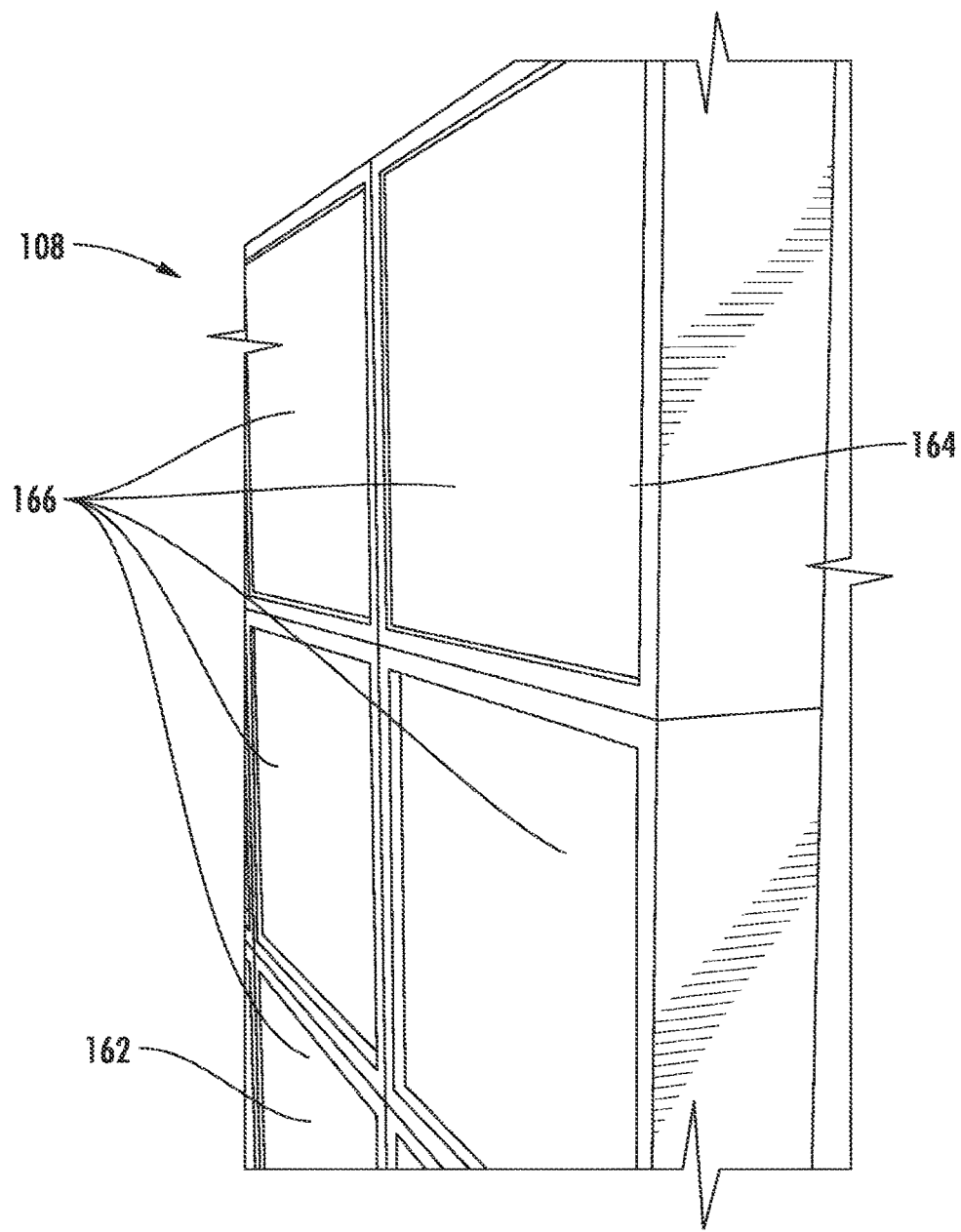
FIG. 14 is a perspective view of an outlet side of the HEPA filter stage of FIG. 13.
Figure 15:
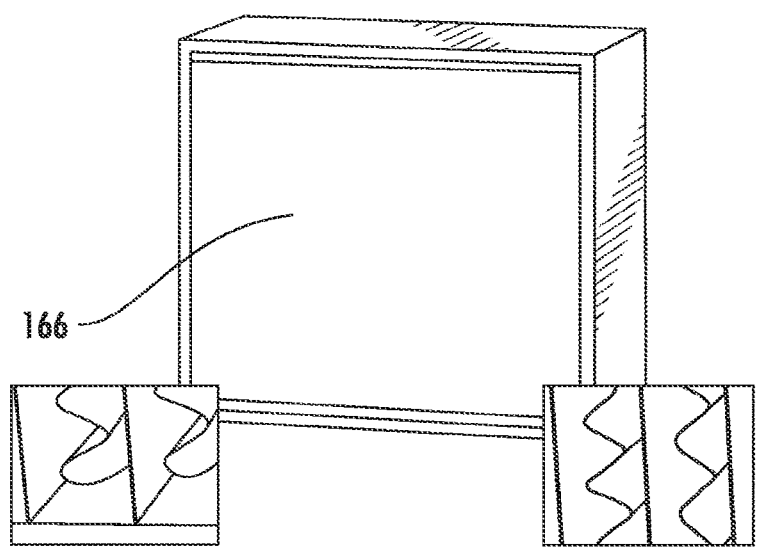
FIG. 15 are perspective and close-up views of a filter used in conjunction with the HEPA filter stage of FIG. 13.
Figure 16:
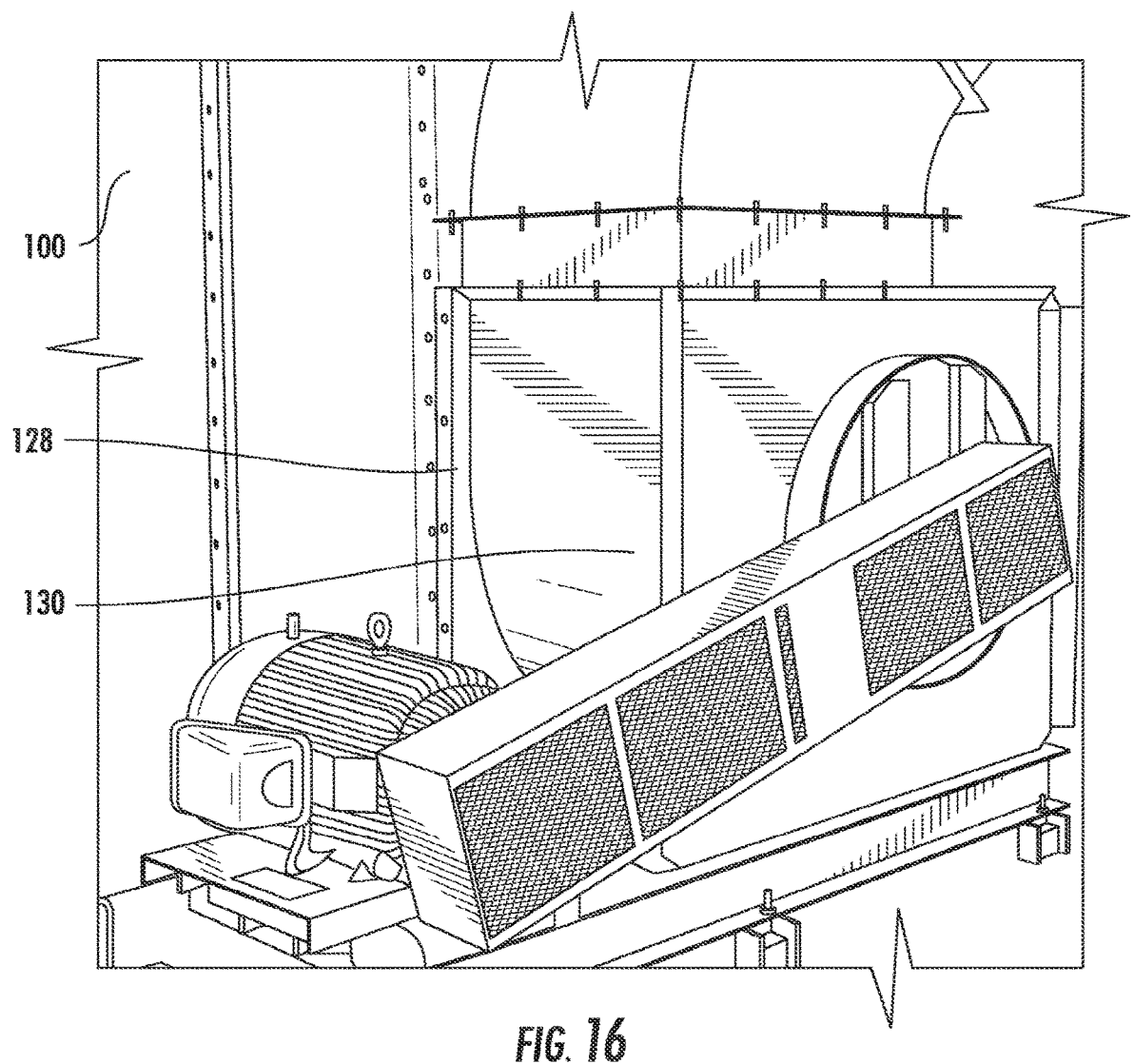
FIG. 16 is a perspective view of a main fan used in conjunction with the multi-stage drum filtration system of FIG. 2.

In some embodiments, as shown in FIGS. 2 and 13-14, once the air has passed through the second passive filter stage 106 and exited the outlet side 154, the air quality may be such that the air can be freely released into the plant, the air may then pass through additional passive filter stages, as described above with respect to the first and/or second passive filter stages, and/or the air may then pass through an optional HEPA filter stage 108. In these embodiments, the air may enter the HEPA filter stage 108 via an inlet side 160 of the HEPA filter stage 108, as illustrated in FIG. 13, and exit via an outlet side 162 of the HEPA filter stage 108, as illustrated in FIG. 14. In some embodiments, the HEPA filter section 108 comprises a bank 164 of multiple individual HEPA filters 166. Each individual HEPA filter 166 may have a configuration as shown in FIG. 15, wherein each filter 166 is 24"×24"×11.5" deep, but may have other suitable dimensions as needed to provide sufficient filtration and particulate removal of the airstream exiting the second passive filter stage 106. Each filter 166 may be rated for at least 2000CFM @ 1.4 inches w.g., but other suitable ratings may be used as needed. The quantity of HEPA filters 166 required in the filter bank 164 is calculated from the total airflow volume through the primary rotary drum filter stage 102.

In these embodiments, as illustrated in FIG. 15, the HEPA filters 166 may have characteristics that enable each filter 166 to capture 99.97% of all particles down to 0.3 micron. One of ordinary skill in the relevant art will understand that any suitable HEPA filter may be used in this stage that provides the desired particulate removal and capacity to efficiently handle the level of dust concentration leaving the second passive filter stage 106.

In certain embodiments, once the air has passed through the HEPA filter stage 108 and exited the outlet side 162, the air quality may be such that the air can be freely released into the plant. Depending on the concentration of dust and the volume of air entering the multi-stage drum filtration system 100, additional passive and/or self-cleaning stages may be added or removed from the system 100 as needed to achieve the desired level of air quality exiting the system 100.

Figure 17:
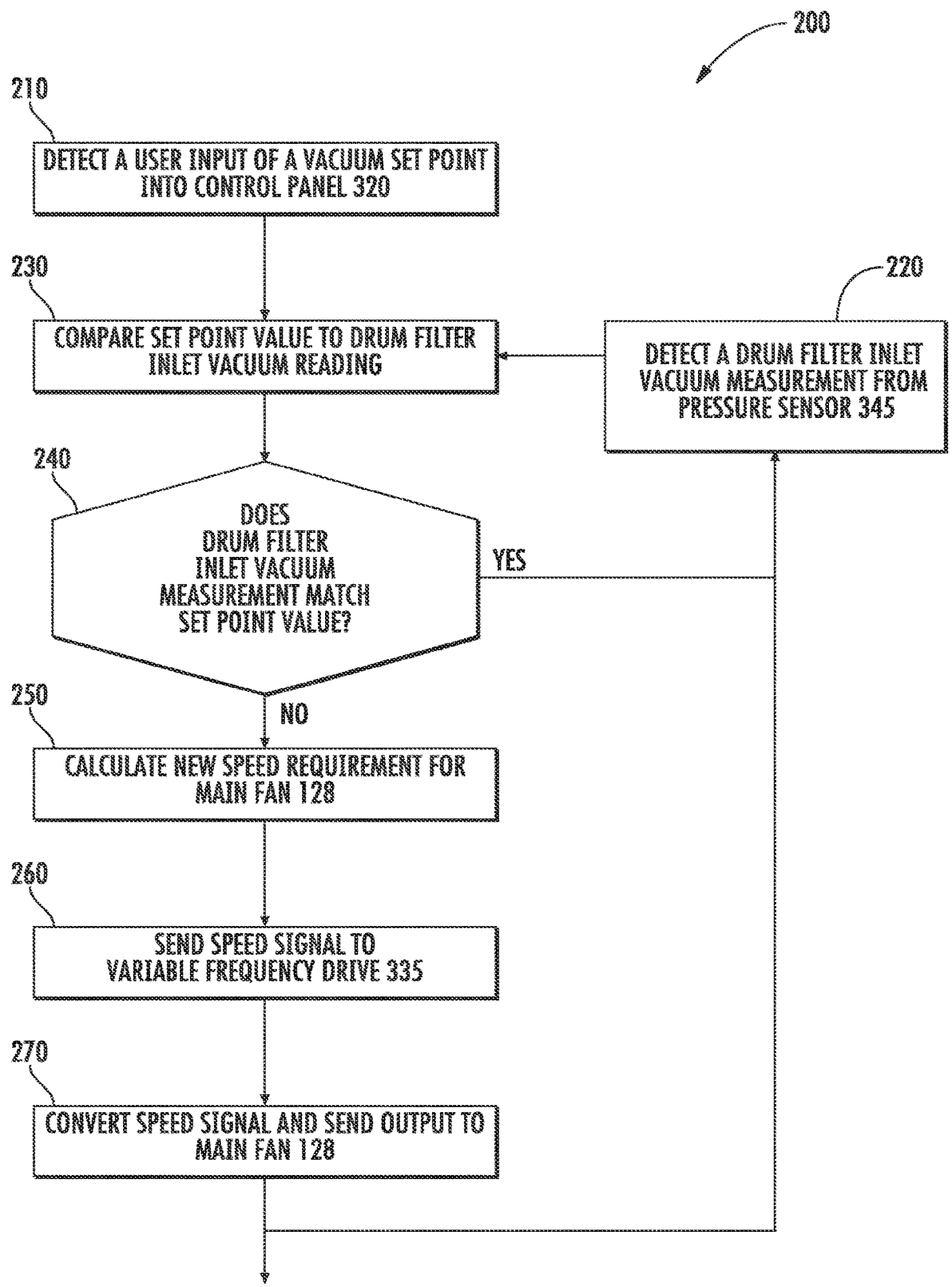
FIG. 17 is a simplified flow diagram illustrating a system for controlling inlet pressure of a multi-stage drum filtration system according to certain embodiments of the present invention.

According to certain embodiments, the level of vacuum throughout the system 100 may be controlled via a control system 200. FIG. 17 is a simplified flow diagram illustrating a system 200 for controlling inlet pressure of a multi-stage drum filtration system according to certain embodiments of the invention. The control system 200 may include processing logic that may comprise hardware (circuitry, dedicated logic, etc.), software (such as is run on a general purpose computing system or a dedicated machine), firmware (embedded software), or any combination thereof.

Referring to FIG. 17, the control system 200 may be configured to control the inlet pressure of the primary rotary drum filter stage 102 by monitoring the vacuum level at the inlet of the primary rotary drum filter stage 102, as illustrated in step 220-240, and adjusting the speed of the main fan 130, as illustrated in steps 250-270, to hold the inlet vacuum at a desired set point (step 210). As the primary rotary drum filter stage 102 becomes dirty (loaded) and experiences an increased pressure drop across it, the control system 200 automatically adjusts by increasing the speed of the main fan 130 to generate the additional vacuum required through the primary rotary drum filter stage 102. By controlling the inlet vacuum, the primary rotary drum filter stage 102 may be operated with a lower vacuum level on the clean side of the primary rotary drum filter stage 102, thereby reducing the amount of dust and particulates that are pulled through the filtration media 122.

To understand the benefit of the control system 200 on the process, it is helpful to first understand how a typical rotary drum filtration system operates without the control system 200. In such a process, the vacuum level of the main fan 130 is held constant (at −12" we typically), and the vacuum level at the inlet to the primary rotary drum filter stage 102 varies depending on the relative cleanliness or dirtiness of each successive filter stage 104, 106, and/or 108. In most applications, the result is that the primary rotary drum filter stage 102 inlet vacuum level ranges from between −9" wc when all of the filter stages are clean, to −3" wc when all of the filters stages are dirty. This inlet vacuum fluctuation occurs slowly, and it typically takes several months to cover the full range. The downside to this control scheme is that there is a higher than necessary vacuum in the clean side of the primary rotary drum filter stage 102. The main fan 130 is sized for the worst case pressure drop (when all filter stages are dirty), but operates at this rating all of the time, even when the filter stages are clean. As a result, this higher vacuum pulls more dust particles through the seal 134 and the filtration media 122 than an optimized vacuum level would.

In the embodiments that utilize the control system 200 to adjust the vacuum level, at step 210, an operator enters the desired inlet vacuum set point into a control panel 320. If there is not a human machine interface ("HMI") on the control panel 320, then the operator enters the value directly into a controller 330 (such as a smart relay or PLC) inside the control panel 320. The recommended inlet set point for standard applications is −2" to −3" wc, but other suitable vacuum set points may be used as needed depending on variations in machinery, materials, throughput, etc.

At step 220, the control system 200 detects the inlet vacuum measurement of the primary rotary drum filter stage 102. The amount of inlet vacuum may be measured with a pressure sensor 345 mounted to the filter enclosure 112 near the inlet to the primary rotary drum filter stage 102. One of ordinary skill in the relevant art will understand that any suitable device may be used that is configured to monitor vacuum levels and provide that information to the control system 200. The pressure sensor 345 generates a 4-20 ma signal based on the vacuum measurement detected inside the filter enclosure 112.

At step 230, a controller 330 (such as a smart relay or PLC) inside the control panel 320 receives the 4-20 ma signal from the pressure sensor 345. This signal is converted to a numeric value representing the vacuum level, and this value is compared against the set point value. At step 240, the controller 330 decides whether the inlet vacuum measurement matches the set point value. If so, no adjustment is required to the speed of the main fan 130 and the control system 200 proceeds to back to step 220. If the two values do not match, then at step 250, the controller 330 calculates the new speed requirement for the main fan 130.

At step 260, the controller 330 outputs a 4-20 ma speed signal to a variable frequency drive ("VFD") 335, which may be used to vary the speed of the direct drive main fan 130 to achieve the required vacuum rating. At step 270, the VFD 335 converts this 4-20 ma signal and outputs the required speed signal (Hz) to the main fan 130. In some embodiments, the VFD 335 may be programmed with a maximum allowable speed output that is intended to maintain the amount of vacuum within the range needed for the particular filter design. In this embodiment, the maximum speed output is based on the fan curve of the main fan 130, and is typically selected so that the maximum static pressure the main fan 130 can generate is −12" wc.

Figure 18:
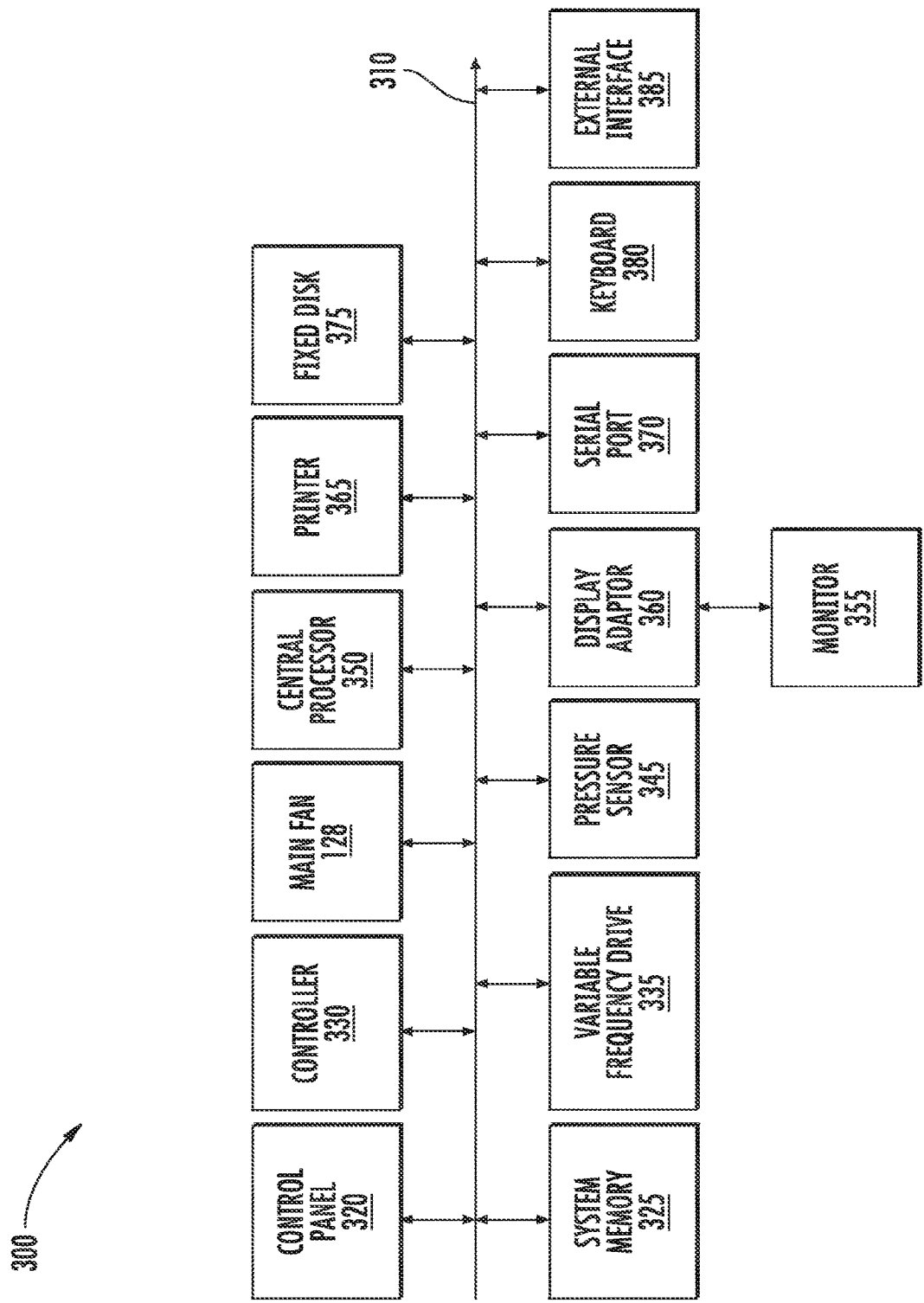
FIG. 18 is diagram of a control system apparatus of a multi-stage drum filtration system according to certain embodiments of the present invention.

FIG. 18 is a diagram of a control system apparatus 300 of a multi-stage drum filtration system according to certain embodiments of the present invention. The various participants and elements in the control system 200 may use any suitable number of subsystems in the control system apparatus 300 to facilitate the functions described herein. Examples of such subsystems or components are shown in FIG. 18. The subsystems or components shown in FIG. 18 may be interconnected via a system bus 310 or other suitable connection. In addition to the subsystems described above, additional subsystems such as a printer 365, keyboard 380, fixed disk 375 (or other memory comprising computer-readable media), monitor 355, which is coupled to a display adaptor 360, and others are shown. Peripherals and input/output (I/O) devices (not shown), which couple to the controller 330, can be connected to the control system 200 by any number of means known in the art, such as a serial port 370. For example, the serial port 370 or an external interface 385 may be used to connect the control system apparatus 300 to a wide area network such as the Internet, a mouse input device, or a scanner. The interconnection via the system bus 310 allows the central processor 350 to communicate with each subsystem and to control the execution of instructions from a system memory 325 or the fixed disk 375, as well as the exchange of information between subsystems. The system memory 325 and/or the fixed disk 375 may embody a computer-readable medium.

The software components or functions described in this application may be implemented via programming logic controllers ("PLCs"), such as Allen Bradley ControlLogix, Siemens S7, or other suitable PLCs. These PLCs may use any suitable PLC programming language, such as Allen Bradley RS Linx, Siemens SIMATIC WinCC, or other suitable PLC programming language. One of ordinary skill in the relevant art will understand that any suitable PLC and/or PLC programming language may be used. In other embodiments, the software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The invention can be implemented in the form of control logic in software or hardware or a combination of both. The control logic may be stored in an information storage medium as a plurality of instructions adapted to direct an information processing device to perform a set of steps disclosed in embodiments of the invention. Based on the disclosure and teachings provided herein, a person of ordinary skill in the art will appreciate other ways and/or methods to implement the invention.

In embodiments, any of the entities described herein may be embodied by a computer that performs any or all of the functions and steps disclosed.

Any recitation of "a", "an" or "the" is intended to mean "one or more" unless specifically indicated to the contrary.

While this invention has been described in detail with particular reference to preferred embodiments thereof, it will be understood that variations and modifications can be affected within the spirit and scope of the invention as described hereinbefore and as defined in the appended claims. For example, the filter enclosure 112 may be used in any industry or application in which fiberized particulate or dust is to be separated from conveying air. Also, it is possible to run the system 100 without the forming fan 116, as long as the main fan 130 can maintain the filter enclosure 112 at a desired negative pressure, and an adequate air flow from the processing line to the main fan 130 may be maintained.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A multi-stage drum filtration system comprising:
   (a) a primary rotary drum filter stage comprising a rotary drum and filtration media;
   (b) a first passive filter stage coupled to an outlet side of the primary rotary drum filter stage;
   (c) at least one second passive filter stage coupled to an outlet side of the first passive filter stage;
   (d) a seal positioned between an open end of the rotary drum and an enclosure wall between the primary rotary drum filter stage and the first passive filter stage;
   (e) a main fan coupled to the stages and configured to create a vacuum on an inlet side of the primary rotary drum filter stage;
   (f) a pressure sensor configured to monitor inlet pressure to the primary rotary drum filter stage; and
   (g) a controller connected to the pressure sensor and the main fan and configured to control a speed of the main fan to maintain the inlet pressure to the primary rotary drum filter stage at a pre-set level.

2. The multi-stage drum filtration system of claim 1, further comprising a HEPA filter stage coupled to an outlet side of the at least one second passive filter stage.

3. The multi-stage drum filtration system of claim 2, wherein the HEPA filter stage comprises a plurality of individual filters, each individual filter comprising a rating of 2000 CFM at 1.4 inches w.g.

4. The multi-stage drum filtration system of claim 1, further comprising a variable frequency drive connected to the main fan, wherein the variable frequency drive receives a speed signal from the controller, converts the speed signal into a new speed signal, and transmits the new speed signal to the main fan.

5. The multi-stage drum filtration system of claim 1, wherein the seal is held in position adjacent the enclosure wall via a mechanical stop.

6. The multi-stage drum filtration system of claim 1, wherein the seal is formed of at least one of composite materials, fabric, and rubber-based materials.

7. The multi-stage drum filtration system of claim 1, wherein the seal has a consistent thickness along its circumference.

8. The multi-stage drum filtration system of claim 1, wherein the seal comprises an overlapping seam.

9. The multi-stage drum filtration system of claim 1, wherein the seal comprises a non-overlapping seam.

10. The multi-stage drum filtration system of claim 1, wherein the seal is seamless.

11. A multi-stage drum filtration system comprising:
    (a) a primary rotary drum filter stage comprising a rotary drum and filtration media formed of a knit material having a woven acrylic backing;
    (b) a first passive filter stage coupled to an outlet side of the primary rotary drum filter stage;
    (c) at least one second passive filter stage coupled to an outlet side of the first passive filter stage;
    (d) a seal positioned between an open end of the rotary drum and an enclosure wall between the primary rotary drum filter stage and the first passive filter stage;
    (e) a main fan coupled to the stages and configured to create a vacuum on an inlet side of the primary rotary drum filter stage;
    (f) a pressure sensor configured to monitor inlet pressure to the primary rotary drum filter stage; and
    (g) a controller connected to the pressure sensor and the main fan and configured to control a speed of the main fan to maintain the inlet pressure to the primary rotary drum filter stage at a pre-set level.

12. The multi-stage drum filtration system of claim 11, further comprising a HEPA filter stage coupled to an outlet side of the at least one second passive filter stage.

13. The multi-stage drum filtration system of claim 12, wherein the HEPA filter stage comprises a plurality of individual filters, each individual filter comprising a rating of 2000 CFM at 1.4 inches w.g.

14. The multi-stage drum filtration system of claim 11, further comprising a variable frequency drive connected to the main fan, wherein the variable frequency drive receives a speed signal from the controller, converts the speed signal into a new speed signal, and transmits the new speed signal to the main fan.

15. The multi-stage drum filtration system of claim 11, wherein the seal is held in position adjacent the enclosure wall via a mechanical stop.

16. The multi-stage drum filtration system of claim 11, wherein the seal is formed of at least one of composite materials, fabric, and rubber-based materials.

17. The multi-stage drum filtration system of claim 11, wherein the seal has a consistent thickness along its circumference.

18. The multi-stage drum filtration system of claim 11, wherein the seal comprises an overlapping seam.

19. The multi-stage drum filtration system of claim 11, wherein the seal comprises a non-overlapping seam.

20. The multi-stage drum filtration system of claim 11, wherein the seal is seamless.

* * * * *